US010135841B2

(12) United States Patent
Beam et al.

(10) Patent No.: US 10,135,841 B2
(45) Date of Patent: Nov. 20, 2018

(54) INTEGRATED SECURITY SYSTEM HAVING THREAT VISUALIZATION AND AUTOMATED SECURITY DEVICE CONTROL

(71) Applicant: Juniper Networks, Inc., Sunnyvale, CA (US)

(72) Inventors: Lisa M. Beam, San Jose, CA (US); Lyubov Nesteroff, Pleasant Hill, CA (US); Natalia L. Shimuk, Mountain View, CA (US); Amol Sood, Fremont, CA (US); Rene Chavez, San Jose, CA (US); Olga M. Towstopiat, Saratoga, CA (US); Nadeem Khan, Bangalore (IN); Ahzam Ali, Bangalore (IN); Dharmendran Arumugam, Bangalore (IN); Mayank Betala, Bangalore (IN); Shrikanta Sharma, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/983,983

(22) Filed: Dec. 30, 2015

(65) Prior Publication Data
US 2017/0126728 A1 May 4, 2017

(30) Foreign Application Priority Data

Nov. 3, 2015 (IN) ........................... 5944/CHE/2015

(51) Int. Cl.
*H04L 29/06* (2006.01)
(52) U.S. Cl.
CPC .......... *H04L 63/14* (2013.01); *H04L 63/0263* (2013.01); *H04L 63/1408* (2013.01);
(Continued)

(58) Field of Classification Search
CPC ........................... H04L 63/14; H04L 63/1408
See application file for complete search history.

(56) References Cited

U.S. PATENT DOCUMENTS 7,908,380 B1 * 3/2011 Chu .................... H04L 12/6418
709/222
8,248,958 B1 8/2012 Tulasi et al.
(Continued)

OTHER PUBLICATIONS

"Tips & Tricks: How to Use the Application Command Center (ACC)", 8 pages (Year: 2015).*
(Continued)

*Primary Examiner* — Thaddeus J Plecha
(74) *Attorney, Agent, or Firm* — Shumaker & Sieffert, P.A.

(57) ABSTRACT

Techniques are described for taking direct actions, such as selectively blocking or allowing traffic and applications, while monitoring events from a graphical representation of threats. As such, the administrator in an enterprise interacts with the graphical representation of threats rendered by the security management system to automatically invoke a policy/rule module of the security management system to configure and update security policies for the security devices deployed throughout the computer networks of the enterprise. An administrator may, for example, interact with the representation of threats rendered by the threat control module based on the data aggregated from the distributed security devices and, responsive to the interaction, the security management system may identify a relevant set of the security devices, automatically construct security policies having ordered rules within the policies for the identified set of security devices, and automatically communicate and install the policies in the identified set of security devices.

29 Claims, 20 Drawing Sheets

(52) U.S. Cl.
CPC ...... *H04L 63/1433* (2013.01); *H04L 63/1441* (2013.01); *H04L 63/20* (2013.01)

(56) References Cited

U.S. PATENT DOCUMENTS

| | | | |
|---|---|---|---|
| 8,291,495 | B1 | 10/2012 | Burns et al. |
| 8,429,255 | B1 | 4/2013 | Khan et al. |
| 9,106,693 | B2 | 8/2015 | Quinlan et al. |
| 9,124,622 | B1 | 9/2015 | Falkowitz et al. |
| 2004/0044912 | A1 | 3/2004 | Connary et al. |
| 2004/0153875 | A1 | 8/2004 | Amyot et al. |
| 2004/0205360 | A1 | 10/2004 | Norton et al. |
| 2006/0028999 | A1 | 2/2006 | Iakobashvili et al. |
| 2006/0140127 | A1 | 6/2006 | Lee et al. |
| 2006/0221077 | A1 | 10/2006 | Wright et al. |
| 2006/0248580 | A1 | 11/2006 | Fulp et al. |
| 2007/0044147 | A1 | 2/2007 | Choi et al. |
| 2007/0118909 | A1 | 5/2007 | Hertzog et al. |
| 2008/0244691 | A1 | 10/2008 | Hilerio et al. |
| 2010/0011433 | A1 | 1/2010 | Harrison et al. |
| 2010/0150008 | A1 | 6/2010 | Sohn et al. |
| 2011/0238826 | A1 | 9/2011 | Carre et al. |
| 2011/0277034 | A1 | 11/2011 | Hanson |
| 2012/0069131 | A1 | 3/2012 | Abelow |
| 2012/0221589 | A1 | 8/2012 | Shahar et al. |
| 2012/0233656 | A1 | 9/2012 | Rieschick et al. |
| 2012/0260306 | A1 | 10/2012 | Njemanze et al. |
| 2012/0278477 | A1 | 11/2012 | Terrell et al. |
| 2012/0317276 | A1* | 12/2012 | Muniraju ............... H04L 41/14 709/224 |
| 2013/0030875 | A1 | 1/2013 | Lee et al. |
| 2013/0055342 | A1 | 2/2013 | Choi et al. |
| 2013/0097662 | A1 | 4/2013 | Pearcy et al. |
| 2013/0097706 | A1 | 4/2013 | Titonis et al. |
| 2013/0174256 | A1 | 7/2013 | Powers |
| 2013/0174259 | A1 | 7/2013 | Pearcy et al. |
| 2013/0263258 | A1* | 10/2013 | Freeman ............. H04L 63/1408 726/22 |
| 2014/0013432 | A1 | 1/2014 | Yi |
| 2014/0137241 | A1 | 5/2014 | Smith et al. |
| 2014/0137242 | A1 | 5/2014 | Kolbly |
| 2014/0157356 | A1 | 6/2014 | Lee et al. |
| 2014/0181972 | A1 | 6/2014 | Karta et al. |
| 2014/0189861 | A1 | 7/2014 | Gupta et al. |
| 2014/0215621 | A1 | 7/2014 | Xaypanya et al. |
| 2015/0026761 | A1 | 1/2015 | Raleigh et al. |
| 2015/0033287 | A1* | 1/2015 | Oliphant ............... G06F 21/554 726/1 |
| 2015/0120959 | A1 | 4/2015 | Bennett et al. |
| 2015/0269438 | A1 | 9/2015 | Samarasekera et al. |
| 2015/0281285 | A1 | 10/2015 | Bharali et al. |
| 2016/0006755 | A1* | 1/2016 | Donnelly ............. H04L 63/0263 726/1 |
| 2016/0014159 | A1* | 1/2016 | Schrecker ........... H04L 63/0869 726/1 |
| 2016/0063387 | A1 | 3/2016 | Srivastava |
| 2016/0072730 | A1* | 3/2016 | Jubran .................... H04L 43/50 709/224 |
| 2016/0080408 | A1 | 3/2016 | Coleman et al. |
| 2016/0191466 | A1 | 6/2016 | Pernicha |
| 2016/0191558 | A1 | 6/2016 | Davison |
| 2016/0205137 | A1 | 7/2016 | Babb et al. |
| 2016/0217187 | A1 | 7/2016 | Iesiev et al. |
| 2016/0226944 | A1 | 8/2016 | Hsiao et al. |
| 2016/0241584 | A1 | 8/2016 | Hitt et al. |
| 2016/0301704 | A1 | 10/2016 | Hassanzadeh et al. |

OTHER PUBLICATIONS

Extended Search Report from counterpart European Application No. 16197172.6, dated Jan. 20, 2017, 7 pp.

Harrington et al., "An Architecture for Describing Simple Network Management Protocol (SNMP) Management Frameworks," RFC 3411, Network Working Group Internet Draft, http://tools.ietf.org/html/rfc3411, IETF, Dec. 2002, 59 pp.

Enns et al., "NETCONF Configuration Protocol," RFC 4741, Network Working Group Internet Draft, http://tools.ieff.org/html/rfc4741, IETF, Dec. 2006, 95 pp.

"Juniper Networks Network and Security Manager Administration Guide Revision 2009.1," Juniper Networks, retrieved from http://www.juniper.net/techpubs/software/management/securitymanager/nsm2009_1 /nsm-admin-guide.pdf, Aug. 2009, 1056 pp.

U.S. Appl. No. 14/983,927, by Lisa M. Beam, filed Dec. 30, 2015.

U.S. Appl. No. 14/983,999, by Oscar Leonardo Bejarano Ardila, filed Dec. 30, 2015.

"Junos Space Security Director," Juniper Networks Data Sheet, Sep. 2015, 4 pp.

"JUNOS OS, NETCONF XML Management Protocol Guide," Juniper Networks, Oct. 6, 2010, 188 pp.

Office Action from U.S. Appl. 14/983,927, dated May 5, 2017, 10 pp.

Office Action from U.S. Appl. No. 14/983,999, dated Jun. 6, 2017, 15 pp.

Response to Final Office Action dated Sep. 6, 2017, from U.S. Appl. No. 14/983,927, filed Nov. 6, 2017, 10 pp.

Final Office Action from U.S. Appl. No. 14/983,927, dated Sep. 6, 2017, 11 pp.

Response to the Office Action dated May 5, 2017, from U.S. Appl. No. 14/983,927, filed Aug. 5, 2017, 9 pp.

Response to the Office Action dated Jun. 6, 2017, from U.S. Appl. No. 14/983,999, filed Oct. 6, 017, 14 pp.

Response to Extended Search Report dated Jan. 20, 2017, from counterpart European Application No. 16197172.6, filed Nov. 3, 2017, 11 pp.

Final Office Action from U.S. Appl. No. 14/983,999, dated Dec. 1, 2017, 19 pp.

Office Action from U.S. Appl. No. 14/983,927, dated Jan. 29, 2018, 14 pp.

Notice of Allowance from U.S. Appl. No. 14/983,999, dated Apr. 18, 2018, 14 pp.

Response to Final Office Action dated Dec. 1, 2017, from U.S. Appl. No. 14/983,999, filed Mar. 1, 2018, 17 pp.

Abedin et al., "Detection and Resolution of Anomalies in Firewall Policy Rules," DBSEC'06 Proceedings of the 20th IFIP WG 11.3 working conference on Data and Application Security, Jul. 31-Aug. 2, 2006, Lecture Notes in Computer Science, vol. 4127., pp. 15-29.

Response to Office Action dated Jan. 29, 2018, from U.S. Appl. No. 14/983,927, filed Apr. 30, 2018, 4 pp.

Communication pursuant to Article 94(3) EPC dated May 29, 2018 received in counterpart EP Application No. 16197172.6, 4 pp.

Advisory Action from U.S. Appl. No. 14/983,927, dated Sep. 10, 2018, 3 pp.

Final Office Action from U.S. Appl. No. 14/983,927, dated Jun. 27, 2018, 16 pp.

* cited by examiner

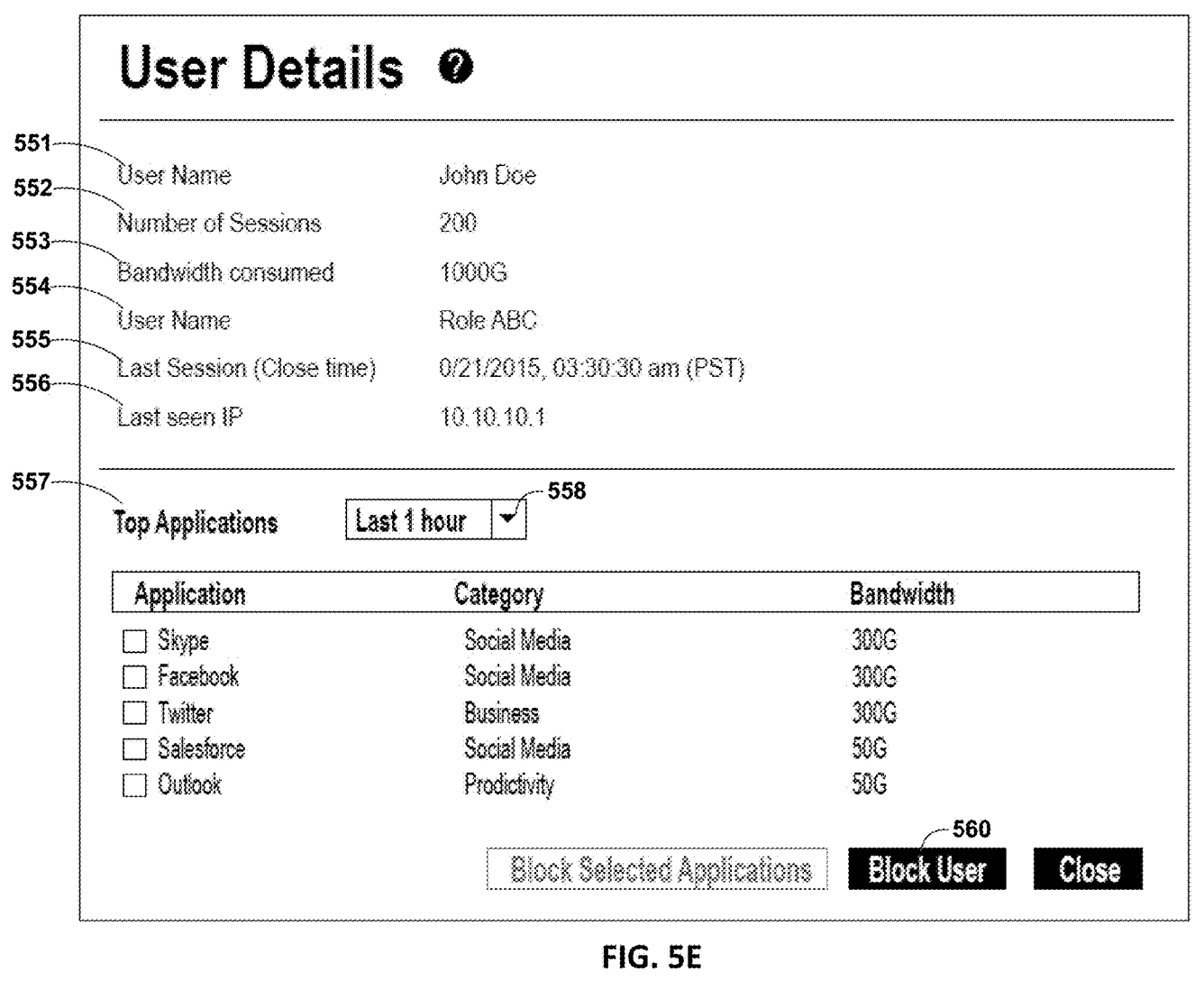

User Details

- User Name: John Doe — 551
- Number of Sessions: 200 — 552
- Bandwidth consumed: 1000G — 553
- User Name: Role ABC — 554
- Last Session (Close time): 0/21/2015, 03:30:30 am (PST) — 555
- Last seen IP: 10.10.10.1 — 556

[Last 1 hour ▼] — 558

Top Applications — 557

| Application | Category | Bandwidth |
| --- | --- | --- |
| ☐ Skype | Social Media | 300G |
| ☐ Facebook | Social Media | 300G |
| ☐ Twitter | Business | 300G |
| ☐ Salesforce | Social Media | 50G |
| ☐ Outlook | Productivity | 50G |

[Block Selected Applications]  [Block User] — 560  [Close]

FIG. 5E

Block

Block Details

In order to block all the traffic coming from and to the source IP Address(s), rules were created and added to policies.

The following policies will contain the block rule(s).

| Policy Name | Rules Added | Devices | Devices With Pending Updates |
|---|---|---|---|
| ☑ Policy ABC | 1 | 20 | 22 |
| ☑ Policy XYZ | 2 | 19 | 22 |
| ☑ Policy CCC | 4 | 8 | 22 |
| ☑ Policy WEQ | 1 | 1 | 22 |

Actions ☐ Schedule publish or update

⚠ One or more policies have additional changes to the Global Configuration file.
The Update action will update all the saved policy changes in the Global Configuration file.

Update  Publish  Save

Cancel

Devices ❶

The following devices will be affected by this change to Policy CCC

| Name | Domain | Managed Status | Connection Status | Policy Type | Delta Configuration |
|---|---|---|---|---|---|
| Chicago | Global | In Sync | Up | All Devices Policy | View Delta Configuration |
| Denver | Global | In Sync | ● Down | All Devices Policy | View Delta Configuration |
| Fairbanks | Global | In Sync | Up | All Devices Policy | View Delta Configuration |
| Helena | Global | In Sync | Up | All Devices Policy | View Delta Configuration |
| Jackson | Global | In Sync | Up | All Devices Policy | View Delta Configuration |
| Lindsay | Global | In Sync | Up | All Devices Policy | View Delta Configuration |
| NY | Global | In Sync | Up | All Devices Policy | View Delta Configuration |
| San Francisco | Global | In Sync | Up | All Devices Policy | View Delta Configuration |

621, 622, 623, 624, 625, 626

Close

INTEGRATED SECURITY SYSTEM HAVING THREAT VISUALIZATION AND AUTOMATED SECURITY DEVICE CONTROL

This application claims the benefit of India Patent Application 5944/CHE/2015, filed Nov. 3, 2015, the entire contents of which are hereby incorporated by reference.

TECHNICAL FIELD

The invention relates to computer networks, and, more particularly, to management and configuration techniques of network security devices.

BACKGROUND

Data and technology stored in computer systems and networks are vulnerable to increasing levels of cyberthreats. Common types of network attacks include Denial of Service (DOS) attacks, spoofing attacks, packet eavesdropping or interception, and the like. Because of the increasing sophistication of cyberthreats, administrators tasked to protect computer networks are increasingly burdened and ill-equipped to mitigate and resolve cyberthreats and network attacks efficiently and effectively. Currently, to respond to the cyberthreats, administrators must take part in a manual, labor-intensive process to configure policies or other protection systems in an attempt to block such threats.

SUMMARY

In general, this disclosure describes an integrated security management system that provides centralized threat visualization and automated control of security devices distributed throughout a network.

For example, in one example implementation, the security management system includes one or more processors, one or more computer-readable memories storing instructions that, when executed, implement a sophisticated user interface and visualization engine that generates and displays a live threat visualization of animated network threats in real-time or near real-time. Moreover, the security management system includes a threat data aggregator that aggregates data on one or more threats from one or more security devices deployed within a security domain, e.g., an enterprise network. The security management system may also include a threat control module capable of displaying the one or more threats and configuring the security devices deployed within the network including, for example, deploying created or updated security policies in response to one or more detected network attacks. An administrator may, for example, interact with the graphical representation of threats rendered by the threat control module based on the data aggregated from the distributed security devices and, responsive to the interaction, the security management system may identify a relevant set of the security devices, automatically construct security policies having ordered rules within the policies for the identified set of security devices, and automatically communicate and install the policies in the identified set of security devices using a policy deployment engine of the underlying network management components of the integrated security management system.

In this way, the security management system enables administrators to take direct actions, such as selectively blocking or allowing traffic and applications, while monitoring events from a graphical representation of threats. As such, the administrator in an enterprise interacts with the graphical representation of threats rendered by the security management system to automatically invoke a policy/rule module of the security management system to configure and update security policies for the security devices deployed throughout the computer networks of the enterprise.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 5A-5E illustrate example user interfaces generated by the security management system to present to an administrator representations of filtered event data associated with a threat, in various aspects of the disclosure.

FIGS. 6A-6D illustrate example user interfaces generated by security management system by which an administrator may review and publish automatically created rules associated with security policies, in various aspects of the disclosure.

FIG. 7 illustrates an example user interface generated by security management system by which an administrator may enable deployment and/or publication of the automatically created security policies, in one aspect of the disclosure.

DETAILED DESCRIPTION

Figure 1:
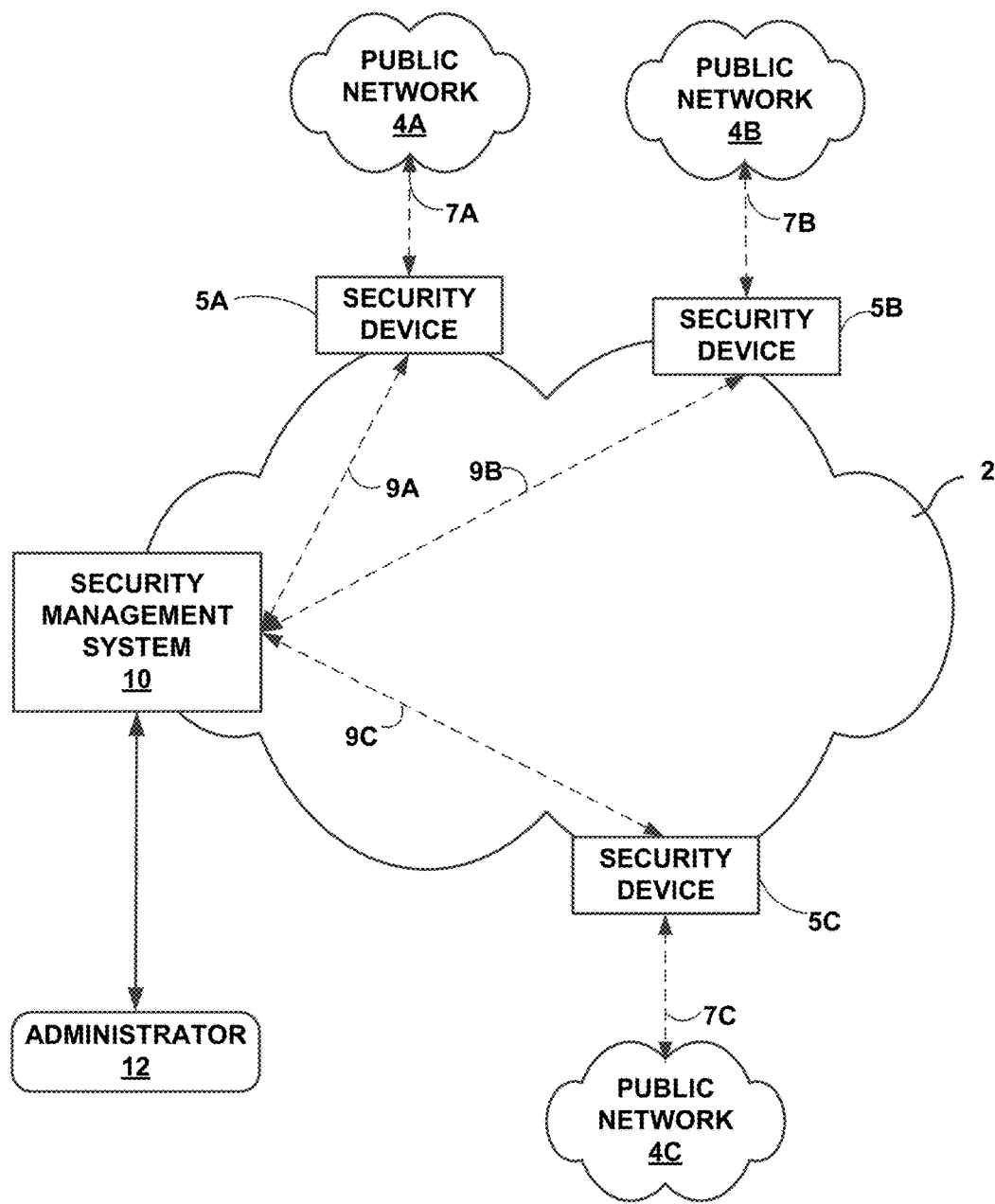
FIG. 1 is a block diagram illustrating an example enterprise network having an integrated security management system as described herein.

FIG. 1 is a block diagram illustrating an example enterprise network having an integrated security management system as described herein. In the example of FIG. 1, enterprise network 2 includes an integrated security management system 10 and one or more security devices 5 deployed in a distributed manner throughout the network.

The one or more security devices 5A-5C (collectively "security devices 5") of enterprise network 2 are interconnected via communication links that form a communication topology. In general, security devices 5 monitor packet flows within network 2 and apply security services to those packet flows so as to protect computing resources (not shown) within the network, such as network servers, end user computers and infrastructure devices providing network connectivity. For example, security devices 5 may perform deep packet inspection on the packet flows to detect patterns or anomalies within the packet flows that are indicative of threats, such as network attacks, viruses, malware and the like. During this process, security devices 5 typically apply polices that define criteria (e.g., header information, patterns, anomaly information) to be compared with the packet flows and take actions specified by the policies, such as dropping packet flows, logging packet flows or redirecting packet flows to packet analyzers for further analysis. Security devices 5 may include, for example, firewalls or other intrusion detection systems (IDS) or intrusion prevention systems (IDP), or even high-end routers or service nodes configured to apply network security services to packet flows within network 2.

While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting security devices 5 may be physical links (e.g., optical, copper, and the like) or wireless. Enterprise network 2 may be coupled to one or more additional private or public networks, e.g., the Internet (not shown).

In the example of FIG. 1, enterprise network 2 is shown coupled to public network 4A-4C (collectively "public network 4") (e.g., the Internet) via communication links 7A-7C, respectively. Public network 4 may include, for example, one or more client computing devices. Public network 4 may provide access to web servers, application servers, public databases, media servers, end-user devices, and other types of network resource devices and content. Network devices in public network 4 may present a number of security threats to enterprise network 2. For example, devices in public network 4 may attempt to deliver worms, trojans, and/or viruses to one or more of security devices 5. As another example, a hacker using a device in public network 4 may attempt to infiltrate enterprise network 2 to snoop, corrupt, destroy, or steal information stored by one or more security devices 5.

As described herein, security management system 10 enables centralized management of security devices 5 by collecting and aggregating threat information from the security devices 5 and presenting a unified, real-time visualization of network threats present throughout enterprise network 2. Moreover, security management system 10 provides an integrated system that provides network administrators, e.g., administrator 12, with a centralized, single point of control for managing security devices 5 in response to network threats.

For example, security management system 10 receives and aggregates data from security devices 5 in real-time as threats are detected and identified within a security domain, e.g., enterprise network 2. Security management system 10 renders and maintains an animated representation of the identified threats based on the data aggregated from distributed security devices 5. Responsive to interaction from administrator 12, security management system 10 identifies a relevant set of security devices 5, automatically constructs security policies having ordered rules within the policies for the identified set of security devices 5, and automatically communicates and installs the policies in the identified set of security devices 5 using an underlying policy deployment engine integrated within security management system 10. In the example of FIG. 1, security management system 10 is illustrated as participating in configuration sessions 9A-9C (collectively "configuration sessions 9") with security devices 5 to communicate and install the policies in the identified set of security devices 5.

In this way, security management system 10 enables administrators 12 to take direct actions, such as selectively blocking or allowing traffic and applications, while monitoring events from a representation of threats identified anywhere within network 2. As such, the administrator is able to interact with the representation of the threats as rendered by security management system 10 to automatically configure and update security policies of security devices 5 deployed throughout network 2.

In common practice, security management system 10 and security devices 5 managed by security management system 10 may be centrally maintained by an IT group of the enterprise. Administrator 12 may interact with security management system 10 to remotely monitor and configure security devices 5. For example, administrator 12 may receive alerts from security management system 10 regarding security devices 5, view live threat and configuration information data of security devices 5, drill-down to filtered representations of filtered threat data, create or update security policies for security devices 5, add new security devices to enterprise network 2, remove existing security devices from enterprise network 2, or otherwise manipulate the enterprise network 2 and security devices therein. Although described with respect to an enterprise network, the techniques of this invention are applicable to other network types, public and private, including LANs, VLANs, VPNs, and the like.

Administrator 12 may use security management system 10 to configure security devices 5 with security policies, where each security policy represents a set of one or more ordered rules that specify certain operational characteristics that further the objectives of administrator 12. For example, administrator 12 may, using policies with a collection of an ordered set of rules, specify for a security device 5 a particular security policy regarding security of incoming or outgoing Internet Protocol (IP) traffic. While described with respect to policies and rules, the techniques of this disclosure may be applicable to other aspects of security devices, including modifying routing tables, or other aspects involving updating or reordering pre-existing security policies or rules.

In general, security devices 5 maintain data for a particular policy (e.g., security) as an ordered list of one or more rules that are each keyed to a unique identifier. Upon occurrence of a triggering event in one of the managed security devices 5, such as the receipt of a network packet, the security device 5 sequentially traverses the ordered list to determine the first policy rule in the list that applies to the triggering event data. If the security device finds an applicable policy rule, the security device proceeds to execute the specified action (e.g., drop the packet, update a traffic log, or redirect the packet for further analysis and inspection, block or allow the packet). Further example details of a centralized network management system capable of managing security devices and deploying policies thereto are described in U.S. Pat. No. 8,429,255, entitled "DETERMINING REORDER COMMANDS FOR REMOTE REORDERING OF POLICY RULES," and U.S. Pat. No. 8,248,958, entitled "REMOTE VALIDATION OF NETWORK DEVICE CONFIGURATION USING A DEVICE MANAGEMENT PRO- TOCOL FOR REMOTE PACKET," the contents of each of which is incorporated herein by reference. Further examples are described in, Network and Security Manager (NSM) application as described in Juniper Networks, "Juniper Networks Network and Security Manager Administration Guide Revision 2009.1," August 2009, available at http://www.juniper.net/techpubs/software/management/security-manager/nsm2009_1/nsm-admin-guide.pdf, which is incorporated herein by reference in its entirety.

Figure 2:
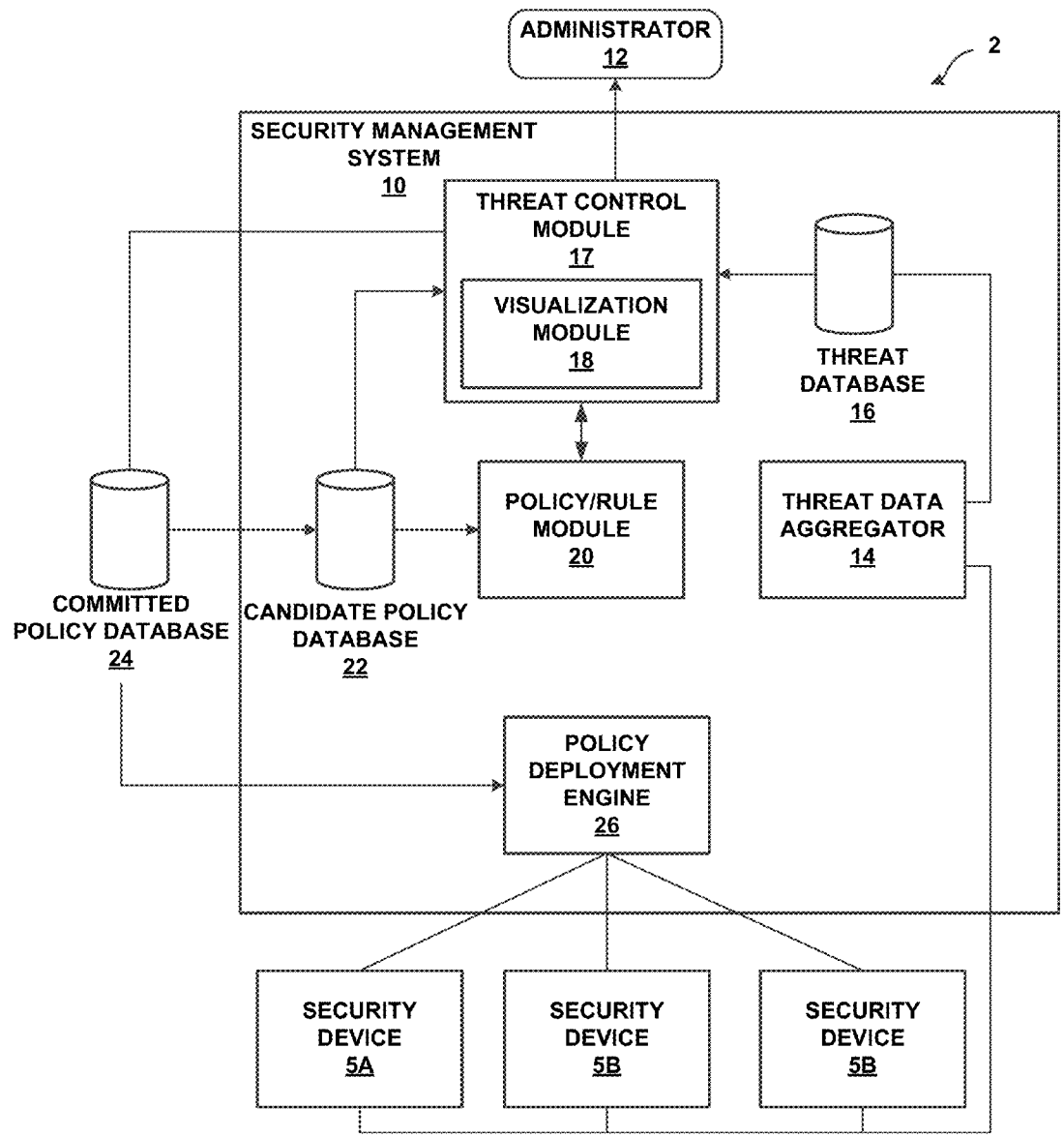
FIG. 2 is a block diagram illustrating an example integrated security management system, in one aspect of this disclosure.

FIG. 2 is a block diagram illustrating an example integrated security management system 10, in one aspect of this disclosure. As described herein, security management system 10 provides a system and interface with which administrator 12 utilizes to view live or near-live threats, quickly assess a filtered representation of filtered threat data associated with a given threat for comprehensive analysis, and to configure or modify various security policies of security devices 5 in response to the threat. In FIG. 2, for example, threat control module 17 of security management system 10 constructs and outputs an interface to enable administrator 12 to view live threats on, for instance, a grid, chart or map, to drill-down to various filtered representations of filtered threat data associated with the threats, to insert or configure new rules in a current or new policy for one or more of security devices 5, to produce an updated policy for the security devices 5, and to delete or change the ordering of existing rules. In response to producing the new or updated policy, administrator 12 may direct security management system 10 to deploy the configuration to one or more of security devices 5 through a policy deployment engine 26 based on the new or updated policy. In some aspects, security management system 10 automatically modifies policies of security devices 5 as a response to, for example, the detection of threats.

Unlike conventional systems, in some example implementations, security management system 10 provides live threat visualization of enterprise-wide threats in real-time or near real-time and integrates automatic policy generation and deployment to security devices 5 in the visualization process, thereby providing a seamless user experience for monitoring and acting on threats in a centralized management system. During a cyberattack, when speed to resolve and mitigate an attack may be critical, the centralized, enterprise-wide live threat visualization coupled with automated policy generation and deployment of security management system 10 may be advantageous. Security management system 10 integrates threat aggregation and visualization with an underlying device management system capable of centrally managing configuration information for network devices of network 2, including security devices 5. For example, various implementations and features of security management system 10 as described herein enables administrator 12 to view live network traffic information and quickly diagnose and prevent an attack, such as by seamlessly enabling administrator 12 to quickly block or temporarily block network traffic for a given set of users, applications, geographic regions, combinations thereof, etc. Security management system 10 may further enable administrator 12 to allow network traffic that is not a threat, but may otherwise have been blocked by conventional techniques. As such, security management system 10 enables administrator(s) 12 to seamlessly update, e.g., construct and deploy, security policies to security devices 5, such as to block or allow packet flows between particular source and destination addresses, block or allow only traffic from a source address, or block or allow only traffic to a destination IP address.

In the example of FIG. 2, security management system 10 may receive detailed analysis of packets from each of security devices 5. In one example, security devices 5, such as an IDS or IDP system, may analyze both client-to-server and server-to-client packet flows, process the packets to perform application classification to identify the type of application and communication protocol associated with each packet flow (e.g., Skype, Yahoo Messenger, Bit Torrent peer-to-peer protocol), perform detailed analysis of the packets, for example, to identify specific fields within the packets in the packet flows, as further described herein. In the example of FIG. 2, security management system 10 includes a threat data aggregator 14 that executes on one or more processors of security management system 10 to aggregate the detailed analysis of the packets received from the one or more security devices 5 with respect to any threats detected within the network.

Security management system 10 may aggregate the threat data with threat data aggregator 14, and may store information describing each active packet flow present within the network traffic within a threat database 16. Threat database 16 may store specifications of security devices 5 associated with each active packet flow, i.e., low-level information such as source and destination devices and ports associated with the packet flow. In addition, security device 5 may identify pairs of packet flows that collectively form a single communication session between a client and server. For example, an IDS 200 may designate communication session as pairs of packet flows in opposite directions for flows sharing at least some common network addresses, ports and protocol. In another example, security management system 10 may poll security devices 5 for traffic information if the security devices 5 do not provide system updates.

In the example of FIG. 2, administrator 12 may view the aggregated threat data collected from security devices 5, aggregated by threat data aggregator 14, and stored in threat database 16, as shown in FIG. 2, formatted, for example, as a list, a grid, a chart, or a map. Threat data aggregator 14 may aggregate IP traffic information and collect various related information associated with the threats such as threat name, count, start time, threat severity, source location, source IP address, destination location, destination IP address, device information, attack category, attack type, service, impact of threat, and action taken, in one aspect of the disclosure. Threat data aggregator 14 may further aggregate application usage data values such as traffic to and from an application, and user data such as bandwidth and sessions.

Threat control module 17 of security management system 10 may further include a visualization module 18 to generate various filtered representations of the live aggregated threat data, such as in grid, chart, or map view. Visualization module 18 may also generate filtered representations of live aggregated threat data in the form of an application usage view or user usage view. Threat control module 17 may then present the generated graphical representation of aggregated data to an administrator 12 for interaction and configuration of security devices 5.

As shown in FIG. 2, security management system 10 may also include a policy/rule module 20 that executes on one or more processors of security management system 10, wherein the policy/rule module 20 may generate configuration information for security devices 5 based on configuration information automatically generated by security management system 10 or defined by administrator 12 and received from threat control module 17. In response to policy/rule module 20 creating or modifying security policies, security management system 10 may store configuration parameters in a candidate policy database 22 for review and eventual publishing to committed policy database 24, as will be discussed in greater detail herein. Security management system 10 may also include a policy deployment engine 26 that sends the updated configuration information of security policies to security devices 5.

In general, the underlying policy deployment engine 26 of security management system 10 may use one or more network management protocols designed for management of configuration information data within managed security devices 5, such as the Simple Network Management Protocol (SNMP) protocol or the Network Configuration Protocol (NETCONF) protocol or a derivative thereof, such as the Juniper Device Management Interface, to manage the security policies within security devices 5. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. NETCONF is described in R. Enns et al., RFC 4741: "NETCONF Configuration Protocol," Network Working Group, the Internet Engineering Task Force draft, December 2006, available at http://tools.ietf.org/html/rfc4741, which is incorporated herein by reference in its entirety. Using the network management protocol, security management system 10 may establish configuration sessions 9 with one or more security devices 5 that allow security management system 10 to traverse and modify configuration information data within the identified security devices 5.

Figure 3:
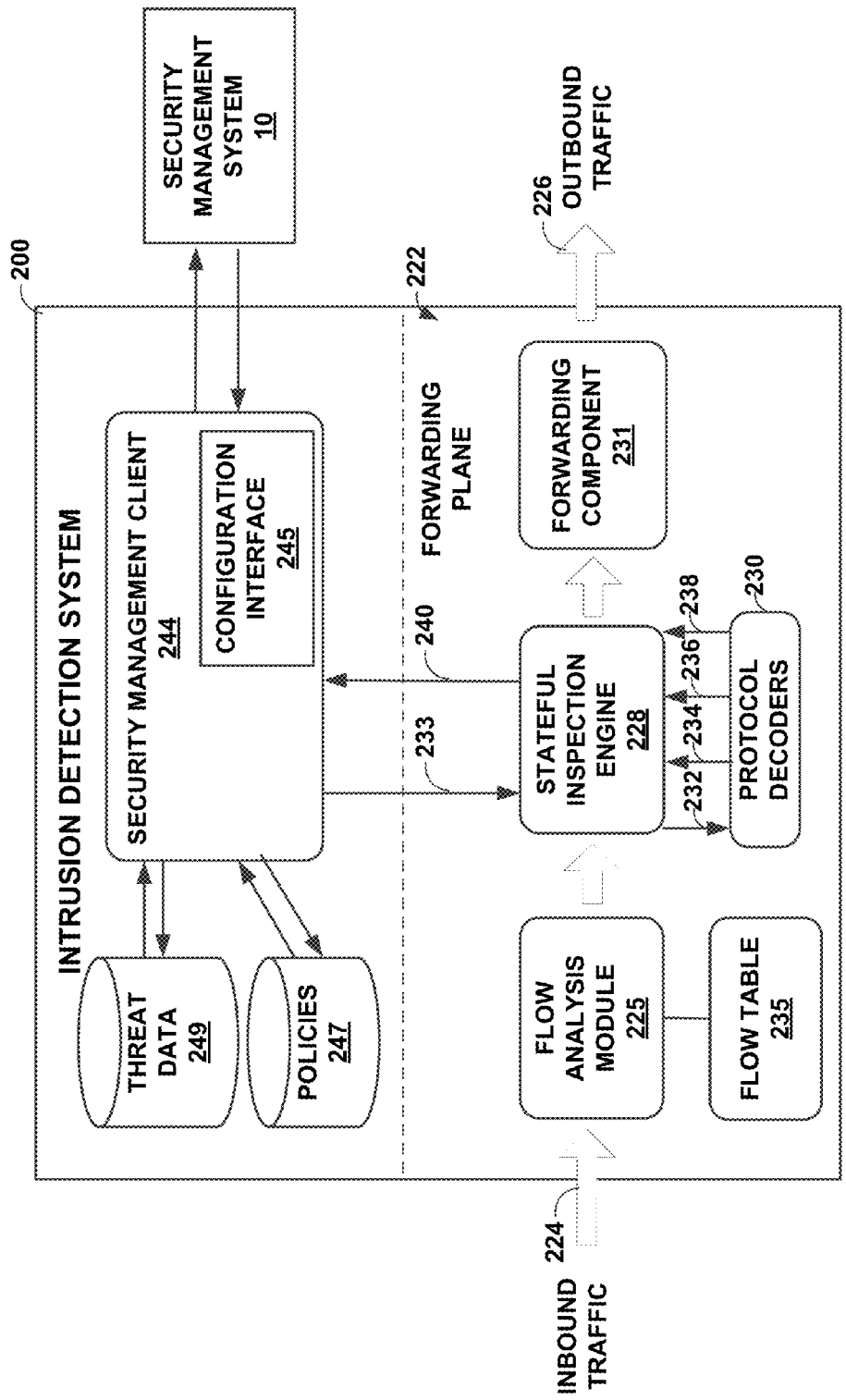
FIG. 3 is an example security device, which processes network flows to identify potential network threats, in one aspect of this disclosure.

FIG. 3 is an example intrusion prevention system (IDS) 200, which represents an example implementation of any of security devices 5 of FIG. 1. As described below, IDS 200 processes network inbound and outbound packet flows entering and egressing network 2 and performs deep packet inspection on packet flows to identify potential network threats and communicates threat information as well as application identification and flow information to security management system 10, in one aspect of this disclosure. Moreover, as further described below, IDS 200 receives policies and other configuration data from security management system 10 and applies those polies to packet flows within the network.

In the illustrated example, IDS 200 includes a forwarding plane 222 that transparently monitors inbound network traffic 224 and forwards the network traffic as outbound network traffic 226. In the example illustrated by FIG. 3, forwarding plane 222 includes flow analysis module 225, stateful inspection engine 228, protocol decoders 230, and forwarding component 231.

Security management client 244 provides a configuration interface 245 for communicating with security management system 10 in accordance with one or more device configuration protocols. For example, responsive to input from administrator 12, security management system 10 may output communications to configuration interface 245 to update policies 247, thereby controlling and configuring IDS 200 to monitor particular subnets of the enterprise network 2 and apply security policy rules received from security management system 10. As another example, security management system 10 may provide and install policies 247 that specify attack definitions 233, which, in some example approaches, security management client 244 relays to stateful inspection engine 228. In one embodiment, attack definitions 233 may be compound attack definitions. Moreover, security management system 10 may present a user interface by which administrator 12 may modify assumptions regarding packet flow characteristics, such as the highest priority packet flows for monitoring, port bindings for applications, or other features of determining a type of application and protocol associated with the packet flow. Security management client 244 may receive the aforementioned information via configuration interface 245 for storage within policies 247 and relays the information to the stateful inspection engine 228 for real-time application to packet flows.

Flow analysis module 225 receives inbound traffic 224 and identifies individual network flows within the traffic. Each network flow represents a flow of packets in one direction within the network traffic and is identified by at least a source address, a destination address and a communication protocol. Flow analysis module 225 may utilize additional information to specify network flows, including source media access control ("MAC") address, destination MAC address, source port, and destination port. Other examples may use other information to identify network flows, such as IP addresses, application sessions, and bandwidth usage.

Flow analysis module 225 maintains flow data within flow table 235 that describes each active packet flow present within the network traffic. Flow table 235 specifies network elements associated with each active packet flow, i.e., low-level information such as source and destination devices and ports associated with the packet flow. In addition, flow table 235 may identify pairs of packet flows that collectively form a single communication session between a client and server. For example, flow table 235 may designate communication session as pairs of packet flows in opposite directions for flows sharing at least some common network addresses, ports and protocol.

As described in further detail below, stateful inspection engine 228 inspects both client-to-server packet flows as well as server-to-client packet flows in order to more accurately identify the type of application and underlying protocol for each communication session. This may assist when, for example, a malicious user attempts to spoof (i.e., mimic) one type of application and instead use another in attempt to bypass an IDS. As an example, a malicious user may attempt to circumvent an IDS by spoofing an SMTP request when actually using the HTTP protocol. IDS 200 may determine from the response from the server that the original packet flow was just an attempt to bypass IDS 200 and may take appropriate action, such as dropping future packets associated with the packet flow and/or alerting the targeted device of the attack.

In some example approaches, IDS 200 may use a minimum data size of the reassembled TCP segments, in addition to the signature, in order to identify the types of applications. Certain applications may require a minimum amount of data, so IDS 200 may distinguish malicious packet flows by determining whether the packet flow contains enough data for the identified protocol. Moreover, IDS 200 may not necessarily recognize every application. In one example, when an application is unknown, IDS 200 may simply forward the packet flow. If IDS 200 cannot identify a given application, it may be because that application is not a typical target for a malicious packet flow. Other examples may take other actions for unidentified applications, however, such as discarding all packets, which target unknown applications or applying a default signature to all packet flows associated with unknown application types. Other examples may also utilize other protocols, such as the user datagram protocol (UDP); IDS 200 accordingly may require a minimum data size of UDP segments in order to identify the application associated with the UDP segments.

For each packet flow, stateful inspection engine 228 buffers a copy of the packet flow and reassembles the buffered packet flow to form application-layer communications 232. For example, stateful inspection engine 228 may reconstruct TCP segments into application-layer communications 232, which represent protocol-specific messages.

Stateful inspection engine 228 invokes the appropriate one of protocol decoders 230 based on the identified type of application determination to analyze the application-layer communications 232. Protocol decoders 230 represent a set of one or more protocol-specific software modules. Each of protocol decoders 230 corresponds to a different communication protocol or service. Examples of communication protocols that may be supported by protocol decoders 230 include the HyperText Transfer Protocol ("HTTP"), the File Transfer Protocol ("FTP"), the Network News Transfer Protocol ("NNTP"), the Simple Mail Transfer Protocol ("SMTP"), Telnet, Domain Name System ("DNS"), Gopher, Finger, the Post Office Protocol ("POP"), the Secure Socket Layer ("SSL") protocol, the Lightweight Directory Access Protocol ("LDAP"), Secure Shell ("SSH"), Server Message Block ("SMB") and other protocols.

Protocol decoders 230 analyze reassembled application-layer communications 232 and output transaction data 234 that identifies application-layer transactions. In particular, transaction data 234 indicate when a series of related application-layer communications between two peer devices starts and ends.

Stateful inspection engine 228 receives transaction data 234, application-layer elements 236 and protocol anomaly data 238 from protocol decoders 230. Stateful inspection engine 228 applies policies 247 (e.g., attack definitions 233 or other rules) to protocol-specific application-layer elements 236 and anomaly data 238 to detect and prevent network attacks and other security risks.

In the event a security risk is detected, stateful inspection engine 228 outputs alert 240 to security management client 244 for logging and further analysis as threat data 249. Threat data 249 may, for example, include packet flow identification information from flow table 235 for those packet flows that have been identified as potential threats. Moreover, threat data 249 may store, for each of the packet flows, application classification information provided by flow analysis module 225 that identifies the type of application-layer application associated with the packet flow. In addition, threat data 249 may include, for each of the packet flows, threat information from stateful inspection engine 228 that characterizes the particular type of threat, such as the identified pattern, anomalies or other qualities of the respective packet flow that triggered one or more policies for classifying the packet flow as a threat.

Security management client 244 relays threat data 249 about the currently detected security risk(s) to security management system 10. In addition, stateful inspection engine 228 may take additional action, such as dropping the packets associated with the communication session, automatically closing the communication session or other action. If no security risk is detected for a given application-layer communication session, forwarding component 231 continues to forward the packet flows between the peers. Forwarding component 231 may, for example, maintain a routing table that stores routes in accordance with a topology of the enterprise network for use in forwarding the packet flows. Operation of IDP and IDS devices is further described in U.S. Pat. No. 9,106,693, entitled "ATTACK DETECTION AND PREVENTION USING GLOBAL DEVICE FINGERPRINTING" the discussion of which is incorporated herein by reference.

Figure 4A:
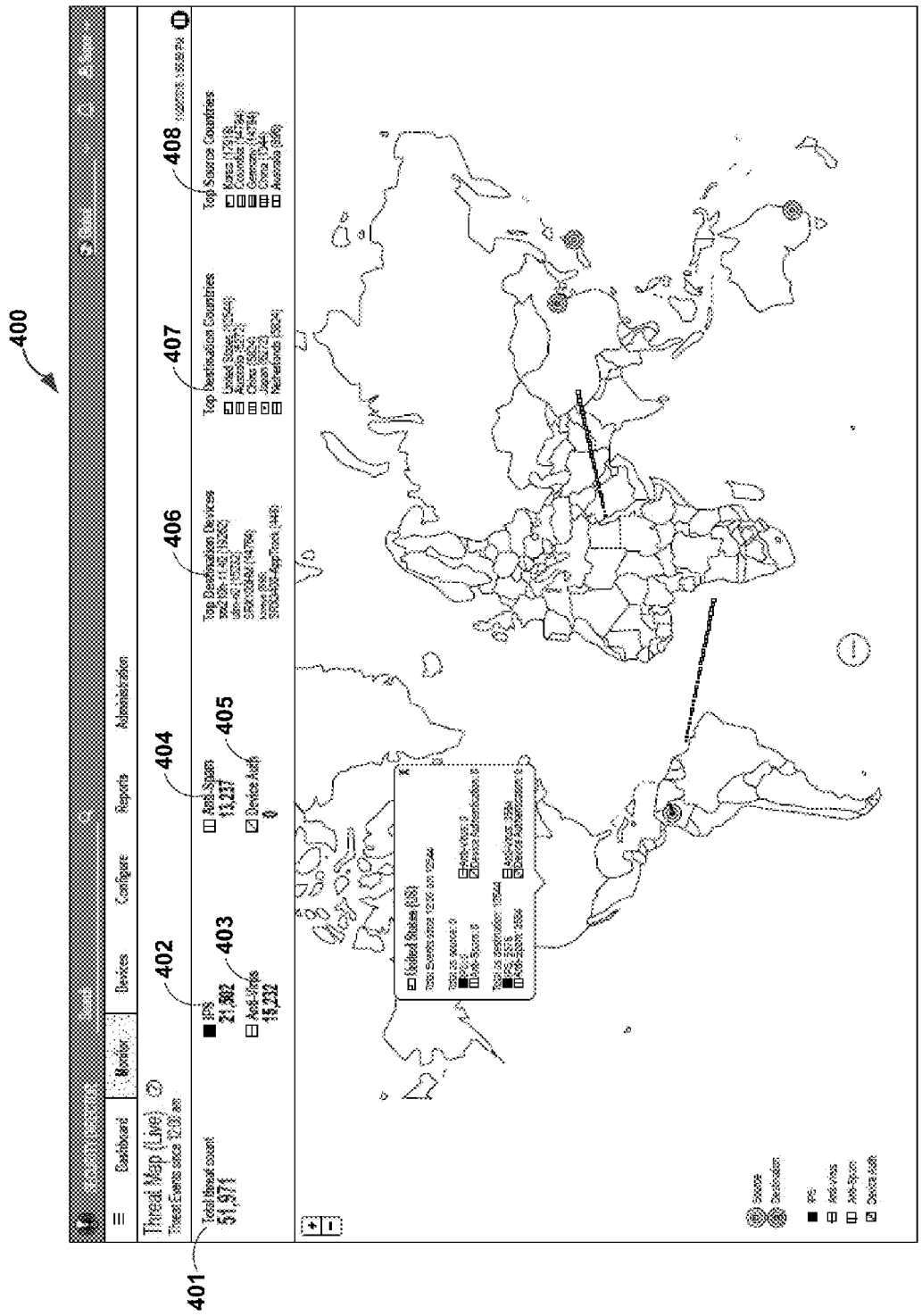
FIGS. 4A-4C illustrate example user interfaces generated by a security management system to present to an administrator a representation of the aggregated threat data, in various aspects of the disclosure.
Figure 4B:
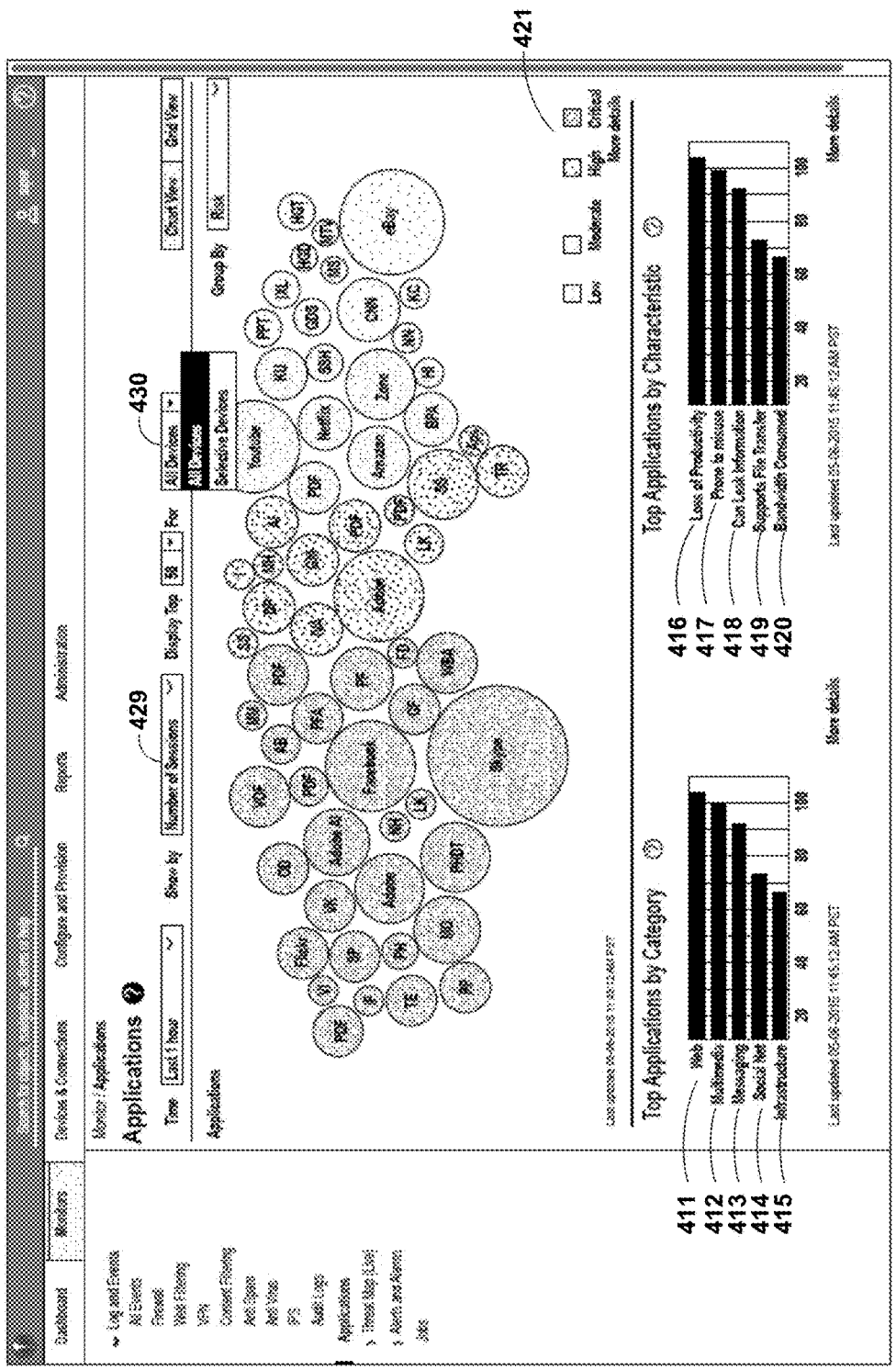
Figure 4C:
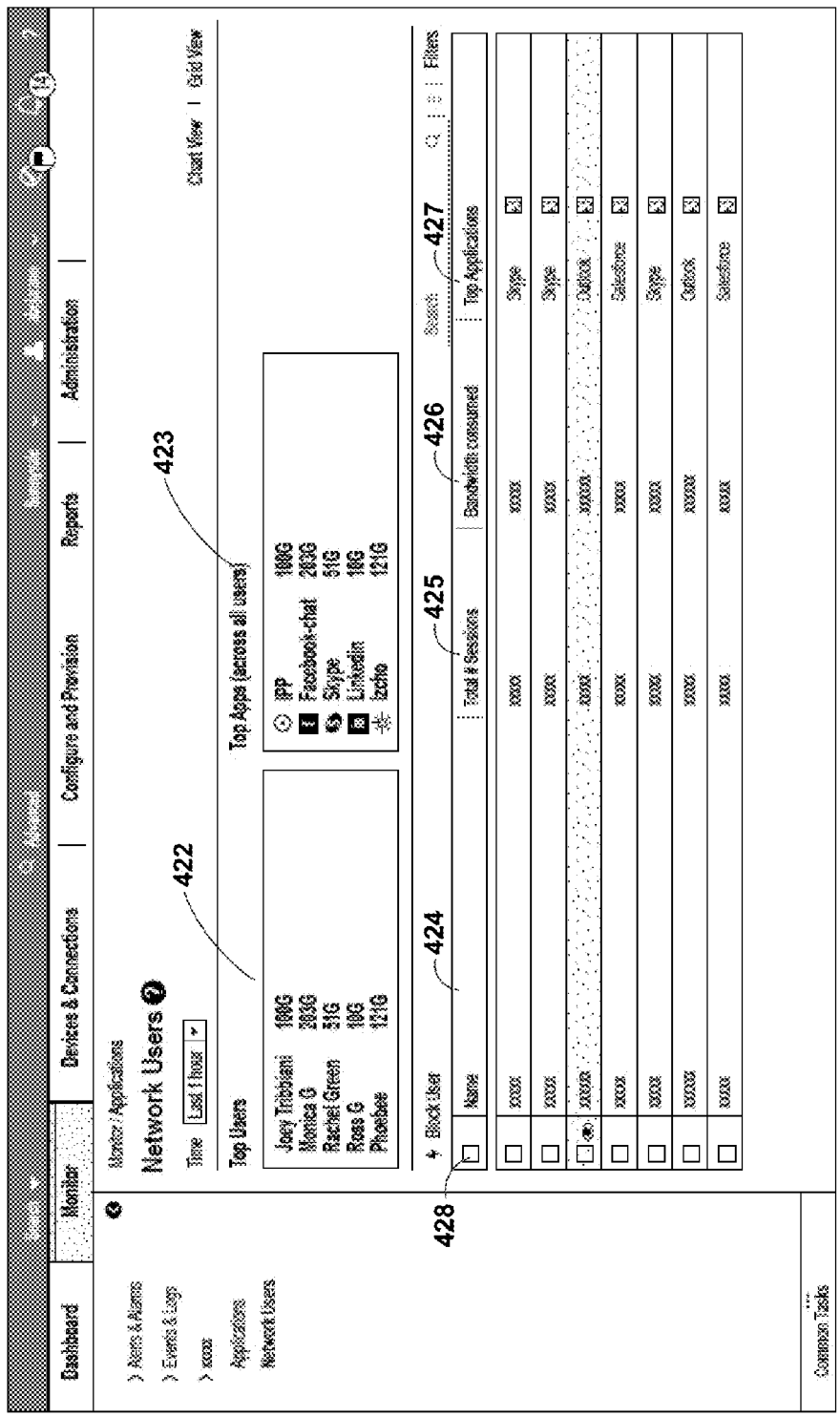

FIGS. 4A-4C illustrate example user interfaces generated by security management system 10 to present to an administrator 12 a representation of the aggregated threat data, in various aspects of the disclosure. Threat control module 17 of security management system 10 may present dynamic threat animations and present user interfaces that may serve to organize network events and associated threat data in a variety of graphical representations.

FIG. 4A illustrates an example user interface generated by security management system 10 by which administrator 12 may view a live threat graphical representation of threats in a map view. For example, visualization module 18 may generate a graphical representation of a map 400 (here, a world map) associated with a security domain (e.g., an enterprise or service provider network) and display statistics such as a total threat count 401, total intrusion prevention system (IPS) events 402, total anti-virus (AV) events 403, total anti-spam events 404, total device authorizations 405 (e.g., successful and/or unsuccessful logins), top destination devices 406, top destination countries 407, top source devices 408, top source countries (not shown), and other information related to aggregated threats. In one embodiment, visualization module 18 may generate a live threat aggregated representation to include one or more variable graphical indicators (e.g., color-code, variations in line thickness, size variations) associated with threats to represent varying magnitude or categories of threats. For example, threats from security device 5A may be represented in one color, whereas threats from security device 5B may be represented in another; or threats with a greater volume may be represented in one color, whereas a lower volume may be represented by another color. In another approach, visualization module 18 may generate a graphical representation of the aggregated threat data with lines connecting the source and destination IP addresses. The visual representation of the lines (e.g., thickness, color, etc.) may represent the magnitude of traffic (e.g., volume of traffic, number of attacks, etc.) between the source and destination IP addresses.

FIG. 4B illustrates another example user interface generated by security management system 10 by which administrator 12 may view aggregate threat data of application usage, in one aspect of the disclosure. In one example, threat data aggregator 14 may aggregate threat data for packet flows that have been identified as particular software applications by security devices 5, where the user interface provides a graphical indicator representative of usage associated with the different types of applications such as number of user sessions with an application and/or bandwidth consumed by an application. Visualization module 18 may generate a graphical representation of the aggregate threat data associated with application usage, such as the example chart view in FIG. 4B. In another approach, visualization module 18 may generate a graphical representation of the aggregated threat data with graphical indicators 421 (e.g., variable sizing and/or color) that may represent the magnitude of application usage and/or severity of threat (e.g., bandwidth consumed from application usage, number of sessions, etc.). Threat control module 17 may then present the graphical representation of aggregated threat data that displays top sessions or bandwidth usage by application based on category (e.g., web 411, multimedia 412, messaging 413, social 414, and/or infrastructure 415). Threat control module 17 may further present an interface displaying top sessions or bandwidth usage by applications based on characteristic (e.g., loss of productivity 416, prone to misuse 417, can leak information 418, supports file transfer 419, and/or bandwidth consumed 420) and for configuration of security devices 5 in response to detecting a threat.

For example, FIG. 4B illustrates an example interface in chart view displaying threat data aggregated by application usage and grouped by risk. In particular, FIG. 4B illustrates an example chart displaying various applications and various graphical indicators 421. In FIG. 4B, for example, an application with a larger sized bubble may represent a higher number of sessions for an application. The bubble's color, such as red, orange, and yellow, may represent the severity of the threat. In some example approaches, a drop down menu 429 is used to select whether to group application icons by risk or by other parameters, while a device select drop down menu 430 allows threat control module to filter the display to shown particular devices 5. Threat control module 17 may also present a user interface by which administrator 12 may select a response to automatically create security policies in accordance with affected security devices 5.

FIG. 4C illustrates another example user interface generated by security management system 10 by which administrator 12 may view aggregate threat data based on user usage, in one aspect of the disclosure. In one example, threat data aggregator 14 may aggregate threat data associated with a network user's application usage from security devices 5 such as number of sessions with an application and/or bandwidth consumed by a specific user. Visualization module 18 may generate a graphical representation of aggregate threat data associated with a specific user's application usage in the manner shown in either FIG. 4A or FIG. 4B above. In one example approach, threat control module 17 may present a user interface overlaying the graphical representation of aggregated threat data that displays top network users usage.

For example, FIG. 4C illustrates an example interface in grid view displaying threat data aggregated by network user usage. In particular, FIG. 4C illustrates an example grid displaying various network users and their top applications used. In one approach, visualization module 18 may further generate a graphical representation of network usage including information on top users 422, top applications 423, the name of users 424, total number of sessions 425, bandwidth consumed 426, and/or top application used 427. Threat control module 17 may also present a user interface (e.g., check box 428) by which administrator 12 may select a response to automatically create security policies in accordance with affected security devices 5.

Figure 5A:
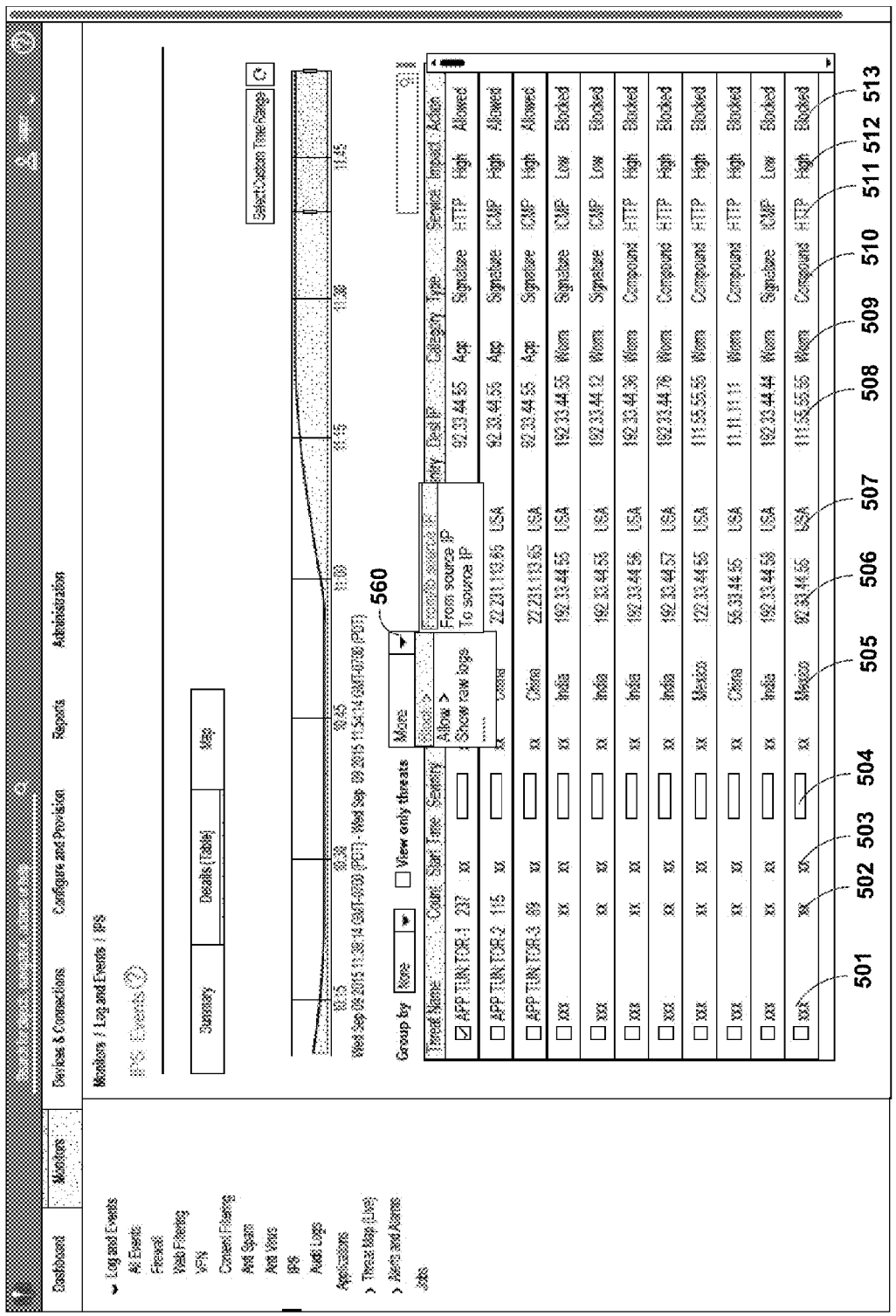

FIGS. 5A-5E illustrate example user interfaces generated by security management system 10 to present to an administrator 12 representations of filtered event data associated with threats, in various aspects of the disclosure. Visualization module 18 may generate various filtered representations of filtered threat data in various views, such as a grid, chart, and map view based on a selection of user interface elements from an administrator 12. Threat control module 17 of security management 10 may present administrator 12 a user interface to select specific user interface elements, such as data from a live-threat aggregated representation, to drill-down to additional threat details displayed in a filtered representation of filtered threat data (overlaying the aggregated representation) generated by visualization module 18. For example, administrator 12 may select a country or other specified geographic location from a live threat map to view a grid of filtered data associated with threats, such as a threat name 501, count of threats 502, start time 503, severity of threat 504, source location 505, source IP address 506, destination location 507, destination IP address 508, category of threat 509, type of threat 510, service 511, impact 512, and threat action status 513 (e.g., allowed or blocked), as shown in FIG. 5A. The threat name 501 may include the name of the potential malicious activity, such as the virus name or malware name. The count 502 may include a counter signifying the number of threats that repeatedly occur within security devices 5. The start time 503 may include time and date information of the threat. The severity 504 may include information on the level of severity of the threat and may be displayed as a graphical or numerical representation. The source location 505 may include information about the location from where the attack originates. The source location may further include finer points of granularity, such as the name of the organization associated with the source IP address, or countries, states, cities, or other specific locations associated with the source. The source IP address 506 may include the IP address of the computer system from which the suspected threat originated. The destination location 507 may include information about the location from where the attack occurs. The destination location may further include finer points of granularity, such as countries, states, cities, or other specific locations. The destination IP address 508 may include the internet protocol address of the computer system that was targeted by the suspected attack. The category 509 may include information about the malicious activity, which includes forms of malware (e.g., viruses, worm, Trojans). The attack type 510 may include information about the type of threat, such as a signature or compound. The service 511 may include information on the protocol used with the attack, including Hypertext Transfer Protocol (HTTP) or Internet Control Message Protocol (ICMP). The threat impact 512 may include the level of impact (e.g., high or low) the threat may have. The threat action status 513 may include information about whether the threat is allowed or blocked. In some graphical representations, users can filter threats with the above information. Threat control module 17 may also present a user interface for administrator 12 to select a response for automatically generating security policies to block or allow traffic of a selected threat in accordance with affected security devices 5.

Figure 5B:
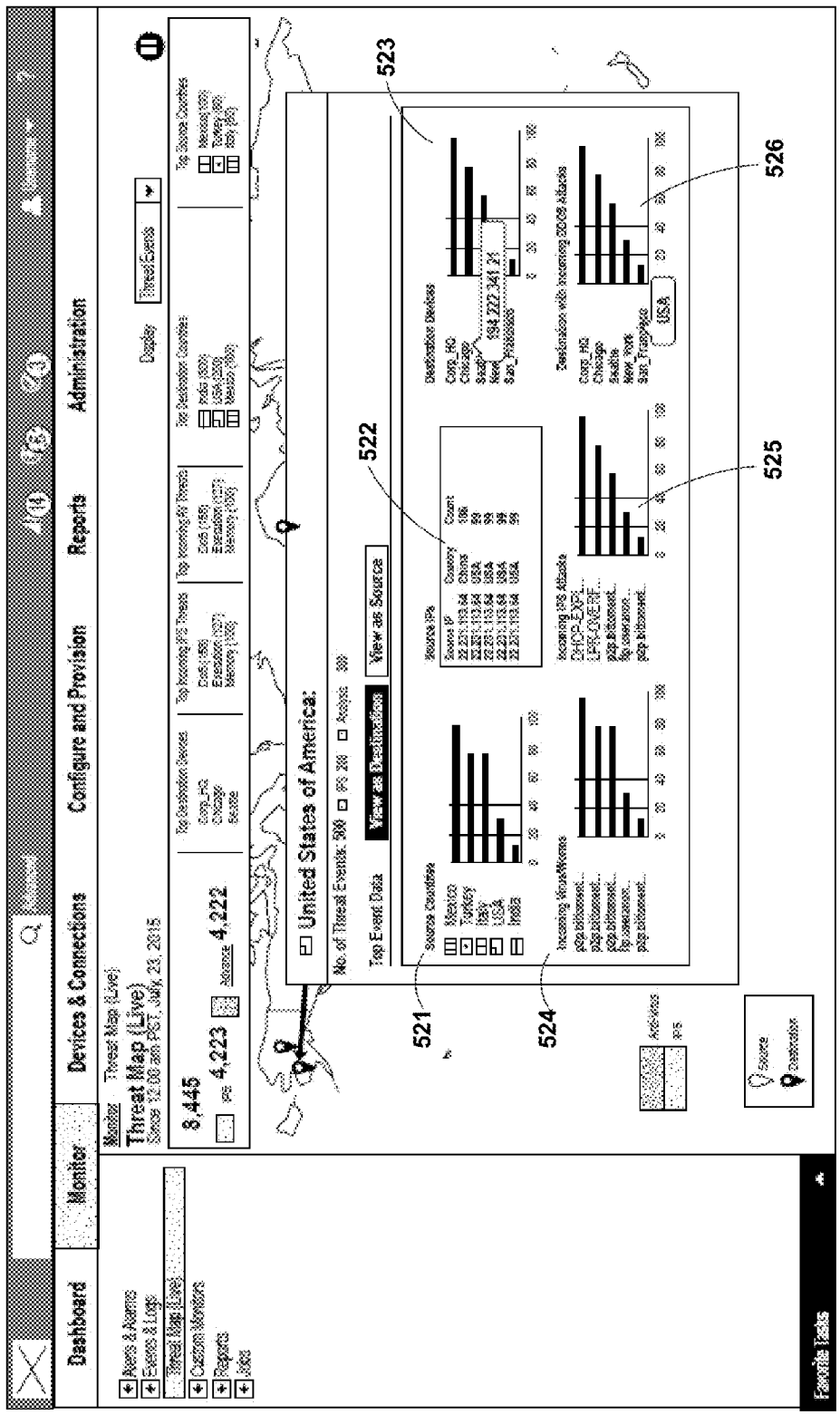

Visualization module 18 may also generate a filtered representation of aggregated threat data in chart view presenting filtered threat data associated with a selected user interface element, such as a geographic location, as shown in the example of FIG. 5B. In the example shown, the interface overlays a map view representation of threats. Upon the selection of a specific country, visualization module 18 may generate a filtered representation of the aggregated threat data and filtered threat details in various charts of interest, such as source countries 521, source IP address 522, destination devices 523, incoming virus/worms 524, incoming IPS attacks 525, devices with incoming DDoS attacks 526, or other threat details. In one instance, administrator 12 may select a country (e.g., United States) from the live threat aggregated representation to view filtered threat details associated with the selected country as a destination or as a source. Threat control module 17 may present a user interface, generated by visualization module 18, by which administrator 12 may view and further interact with the filtered threat details and select various filtered threat details for additional information, as shown in FIG. 5B. Threat control module 17 may also present a user interface by which administrator 12 may select a response for automatically generating security policies to block or allow traffic of a selection in the chart view in accordance with affected security devices 5.

Figure 5C:
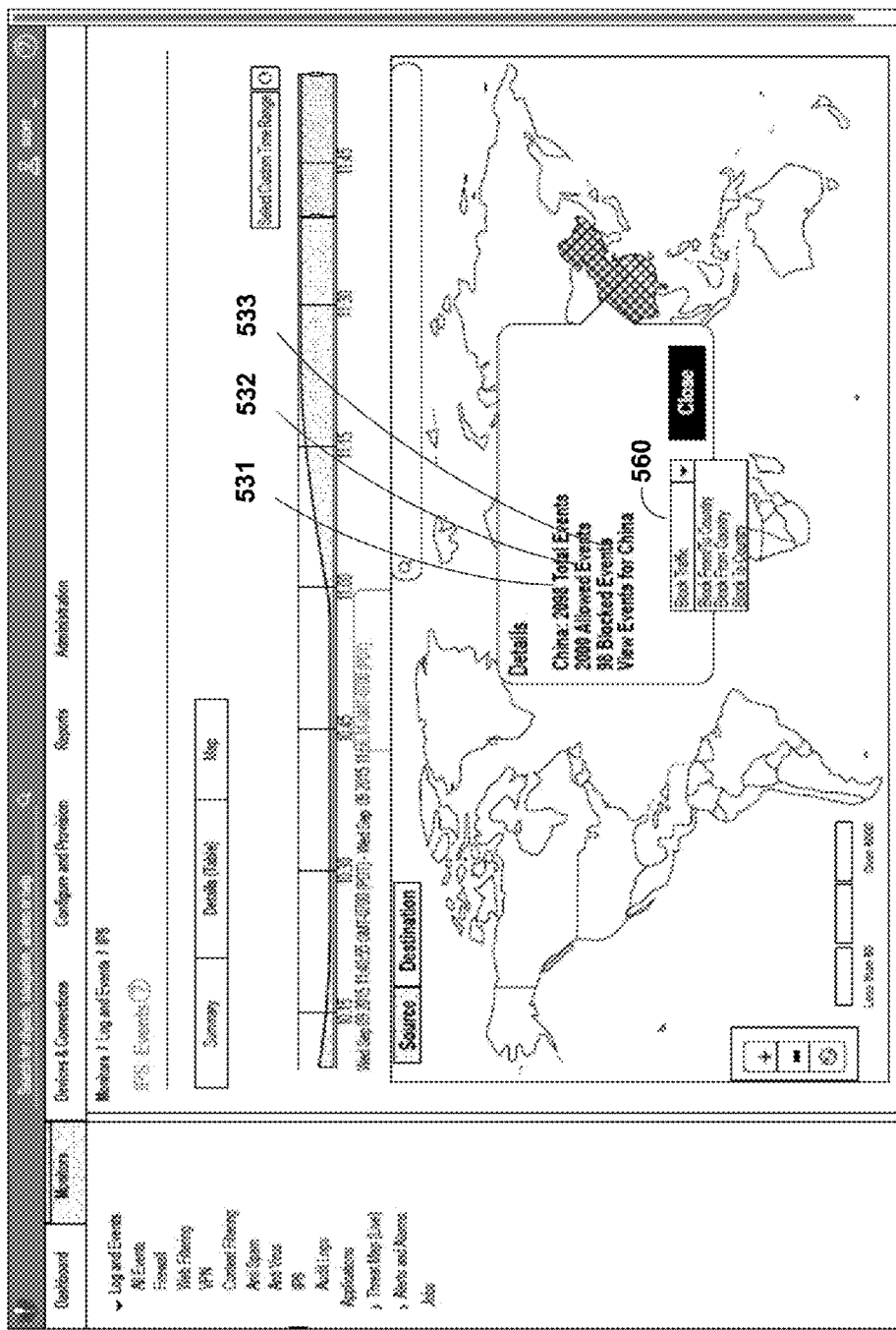

FIG. 5C illustrates another example user interface generated by security management system 10 that may present to administrator 12 a graphical representation in map view of filtered event data associated with geographically based threats, in one aspect of the disclosure. Visualization module 18 may generate a map representation of aggregated threat data and may also include filtered threat data associated with a selected location by administrator 12. Threat control module 17 may present administrator 12 an interface to view and further interact with additional filtered threat details and to selectively block or allow traffic or types of traffic associated with the approximate geographic location, as shown in FIG. 5C. In one example of a filtered representation associated with the threats, filtered threat details may include total events 531, allowed events 532, and blocked events 533 associated with a particular country. In another example, threat data from either source IP addresses or destination IP addresses may be presented. A threat action response 560 allows the user to block traffic directly from the threat details interface.

Figure 5D:
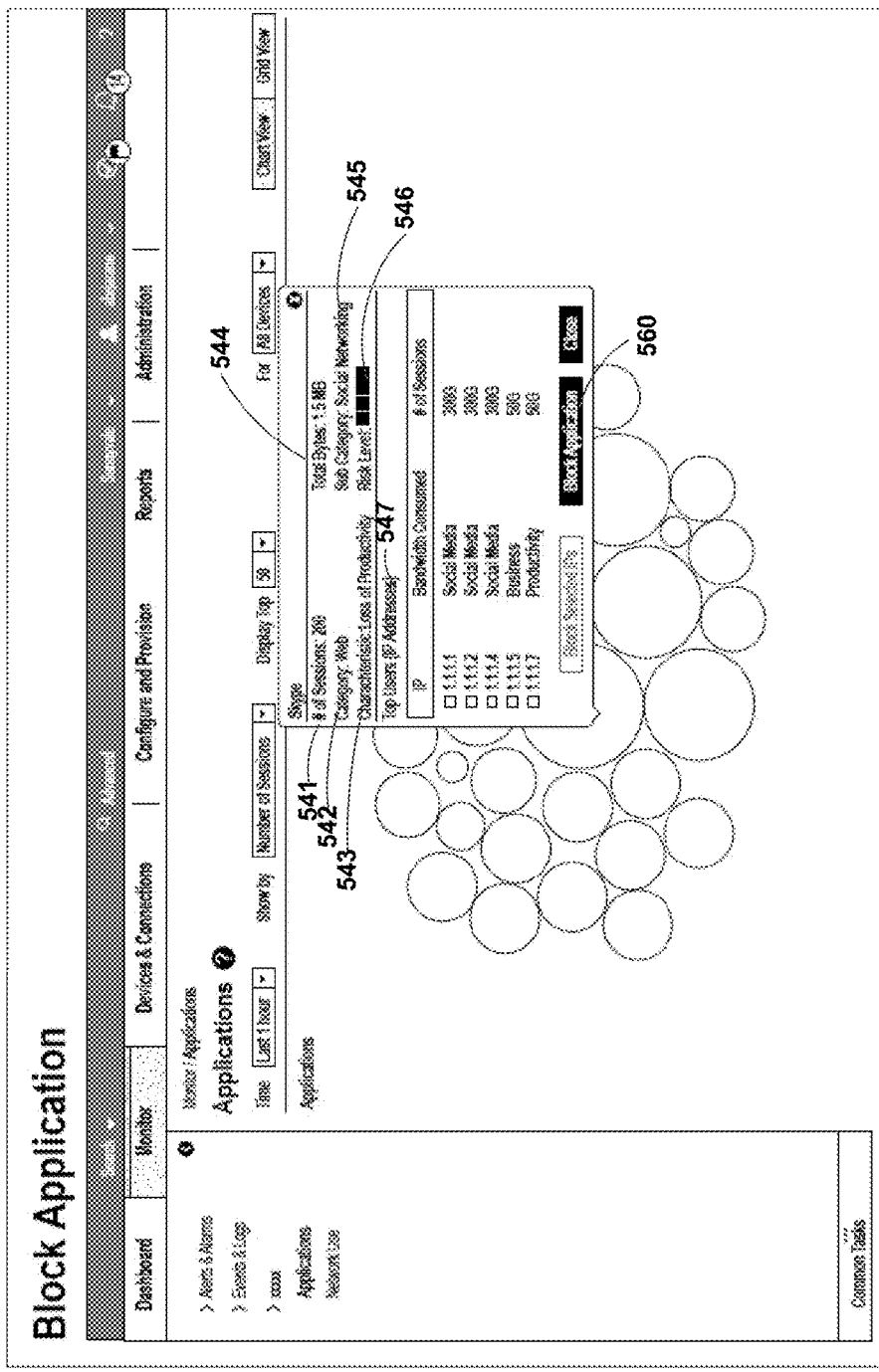

FIG. 5D illustrates another example user interface generated by security management system 10 that may present to administrator 12 a filtered representation of aggregated threat data relating to a selected application in chart view. In one example, visualization module 18 may generate a filtered representation of filtered threat details associated with a selected application from the aggregated representation of threats. Threat control module 17 may present a user interface by which administrator 12 may select a user interface element, such as a particular application from the aggregated representation of live threats, to drill-down to additional threat details associated with application usage, such as number of sessions of an application in a particular amount of time 541, category of application 542 (e.g., web, multimedia, messaging, social, infrastructure), characteristic of threat 543 (e.g., loss of productivity, prone to misuse, can leak information, supports file transfer, bandwidth consumed), total bytes used in a particular amount of time 544, sub-category of application 545 (e.g., social networking), risk level 546, and/or top users of the application 547. Threat control module 17 may also present a user interface by which administrator 12 may select a response for automatically generating security policies to block or allow traffic from particular applications in accordance with affected security devices 5. In the example shown in FIG. 5D, a threat action response 560 allows the administrator to block traffic directly from the threat details interface.

In one example approach, threat control module 17 displays icons reflecting parameters such as the number of sessions for a particular application or the bandwidth used by the application, and the administrator can block traffic associated with the application, or rate limit the application.

In another example approach, threat control module 17 displays icons reflecting parameters such as the number of sessions for a particular user or the bandwidth used by a user, and the administrator can block particular traffic for that user, or rate limit the user.

In yet another example approach, threat control module 17 displays icons reflecting parameters such as the number of sessions per application for a particular user or a particular device or the bandwidth per application used by a user or a particular device, and the administrator can block traffic for specific applications for that user or device, or rate limit the user or device with regard to specific applications.

FIG. 5E illustrates another example user interface generated by security management system 10 that may present to administrator 12 a filtered representation of filtered threat details relating to user usage of applications in grid view. In one example, visualization module 18 may generate a filtered representation of filtered threat details associated with a selected network user. Threat control module 17 may present a user interface by which administrator 12 may select a user interface element, such as a particular user from the aggregated representation of live threats, to drill-down to filtered threat details associated with a network user, such as user name 551, number of sessions by user 552, bandwidth consumed by user 553, user role 554, date and time of last session 555, and last seen IP 556. In another example, the user interface of FIG. 5E may also include the top applications 557 used by the selected user based on a period of time 558. Threat control module 17 may also present a user interface for administrator 12 to select a response for automatically generating security policies to block or allow traffic from a particular user in accordance with affected security devices 5. In the example shown in FIG. 5E, a threat action response 560 allows the administrator to block traffic directly from the user threat details interface.

Security management system 10 may also present a user interface by which administrator 12 may interact with the aggregated representation of live threats and filtered threat details rendered by security management system 10 and, responsive to the interaction, the integrated security management system 10 may identify a relevant set of security devices 5, automatically construct for the security devices 5 updated policies having ordered rules within the policies using a policy/rule module 20, and automatically communicate and install the policies in the security devices 5 using a policy deployment engine 26 of the underlying security management system 10.

As stated prior, security management system 10 may provide, through threat control module 17, a system and an interface that administrator 12 may use to view live threats and to quickly assess filtered threat data associated with the threat for comprehensive analysis. In response to the live threat, administrator 12 may direct security management system 10 to automatically create security policies for deployment to security devices 5 in response to the detected threat. For example, threat control module 17 of security management system 10 may present an interface to enable administrator 12 to insert new rules in a current policy of one of security devices 5, to configure an updated policy for the security device 5, and to delete or change the ordering of existing rules.

In one instance, administrator 12 may select to view filtered threat details from the live threat aggregated representation. Security management system 10 may then present a user interface by which administrator 12 may automatically create security policies for affected security devices 5 based on the filtered threat details. For example, in FIG. 5A, the threat control module 17 may present a user interface by which administrator 12 may select the Threat Name 501, App:TUN:TOR-1 and may select a threat action response 560, such as to block traffic from or to the source IP address, to block both the traffic going to and from the source IP address, block only the traffic coming from the source IP address, or block only the traffic going to the source IP address within any of the graphical representations of threats. Administrator 12 may select to block or allow traffic in response to detecting the specific threat from the graphical representation of threats.

In another example, administrator 12 may select a source IP address in a graphical representation in chart view (e.g., FIG. 5B) to view threat data associated with the selected source IP address (e.g., in an interface similar to FIG. 5A). Administrator 12 may further select a threat action response to block or allow traffic from the graphical representation in chart view, which will navigate administrator 12 to another user interface presented by threat control module 17 of security management system 10.

In another example, administrator 12 may select a country in a graphical representation in map view (e.g., FIG. 5C) to view threat data associated with the selected geographic location. Administrator 12 may further select a threat action response 560 to block or allow traffic directly from the graphical representation in map view, which will navigate administrator 12 to another user interface presented by threat control module 17 of security management system 10. In other examples, administrator 12 may select locations with finer granularity, such as states, cities, and other regions.

In another example, administrator 12 may select a particular application in a graphical representation in chart view displaying threat data aggregated by application usage to view additional details associated with the selected application (e.g., FIG. 5D). Administrator 12 may further select a threat action response 560 to block or allow traffic from the graphical representation in chart view, which will navigate administrator 12 to another user interface presented by threat control module 17 of security management system 10.

In another example, administrator 12 may select a particular network user in a graphical representation displaying threat data aggregated by application usage to view additional details associated with the selected network user (e.g., FIG. 5E). Administrator 12 may further select a threat action response 560 to block or allow traffic from the graphical representation, which will navigate administrator 12 to another user interface presented by threat control module 17 of security management system 10.

Figure 6B:
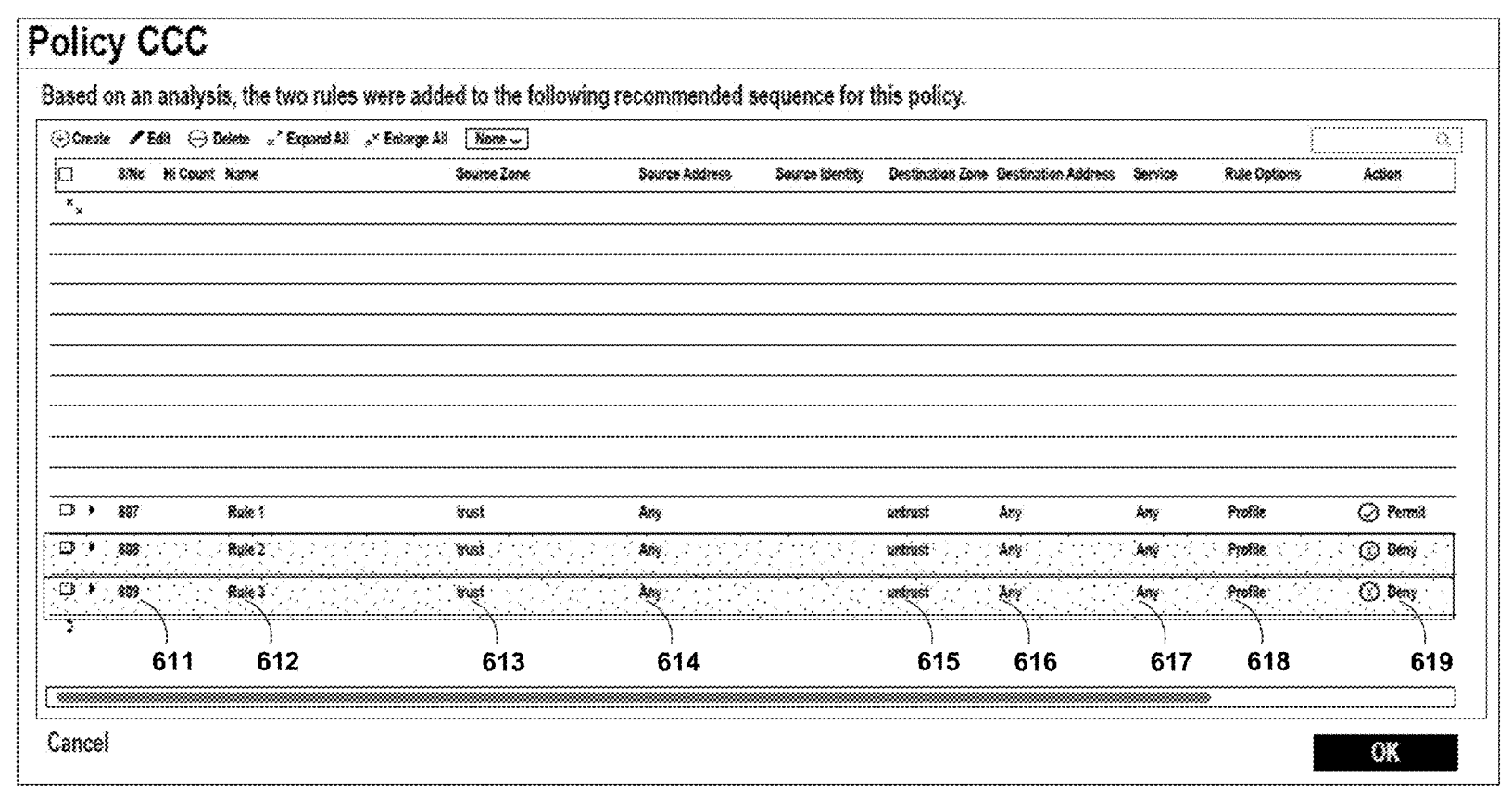

FIGS. 6A-6C illustrate example user interfaces generated by security management system 10 by which administrator 12 may review and publish automatically created rules associated with security policies, in various aspects of the disclosure. In one example, FIGS. 6A-6C may be an interface overlaying the representations of threats or filtered threat data. In response to selecting a threat action response 560 to block or allow traffic relating to a threat, security management system 10 may generate an interface by which administrator 12 may configure the automatically generated revised policies for blocking or allowing traffic, as shown in FIG. 6A. FIG. 6A illustrates an example user interface presented to administrator 12 to view and selectively deploy the automatically generated security policies, in one aspect of the disclosure. The user interface enables administrator 12 to selectively deploy any or all of the automatically generated policies for configuration of security devices 5. In this example, security management system 10 automatically generated revisions to the ordered set of rules within each of the security policies in response to selecting a threat action response 560, including modifying internal rules and the ordering of rules within the policies, to block traffic coming from and/or to the source IP address(es), in one aspect of the disclosure.

The example interface of FIG. 6A may provide a list of the automatically generated revised policies to select. In one example, the user interface of FIG. 6A may provide administrator 12 information on created policies 601, number of rules added 602, number of devices 5 the policy is applied to 603, and number of devices 5 with pending updates 604 related to policy changes. In another example, pre-existing security policies and associated information of affected security devices 5 stored in committed database 26 may be retrieved and presented to administrator 12 for further review. In another example, the interface of FIG. 6A may also include information associated with affected devices that have invoked a policy within a previous duration of time (e.g., month, week, days, etc.).

Threat control module 17 of security management system 10 may also, in response to selection of a particular policy, present an interface to configure policy rules associated with the selected threat, as shown in FIG. 6B. FIG. 6B illustrates an example user interface generated by the security management system 10 by which administrator 12 may view the particular rules automatically created for a given policy that was generated by the security management system 10, in one aspect of the disclosure. For example, administrator 12 may select a specific policy within the interface of FIG. 6A and may further create, edit, delete, or order one or more rules for a firewall policy, as shown in FIG. 6B. In one example, rules automatically generated may suggest rule placement in the generated security policy. In another example, the interface of FIG. 6B may present administrator 12 the option to designate or modify the order of rules 611, the name of rules 612, define whether the source zone 613 and/or destination zone 615 may be trusted or untrusted, define source address 614 and/or destination address 616 the rule applies to, define a service of rules 617, define rule options 618, or define the action of a rule within a security policy 619, such as to permit traffic or to deny traffic. For instance, administrator 12 may use interface FIG. 6B, presented by threat control module 17, to specify "Rule 2" and "Rule 3" to have a sequence number of 808 and 809, respectively, and to specify the action to deny IP traffic for Policy CCC.

As shown in FIG. 2, security management system 10 may also include a policy/rule module 20 that executes on one or more processors of security management system 10, wherein the policy/rule module 20 may generate configuration information for security devices 5 based on configuration information automatically generated by security management system 10 or defined by administrator 12 and received from threat control module 17. In response to policy/rule module 20 creating or modifying security policies, security management system 10 may store configuration parameters in candidate policy database 22.

Figure 6D:
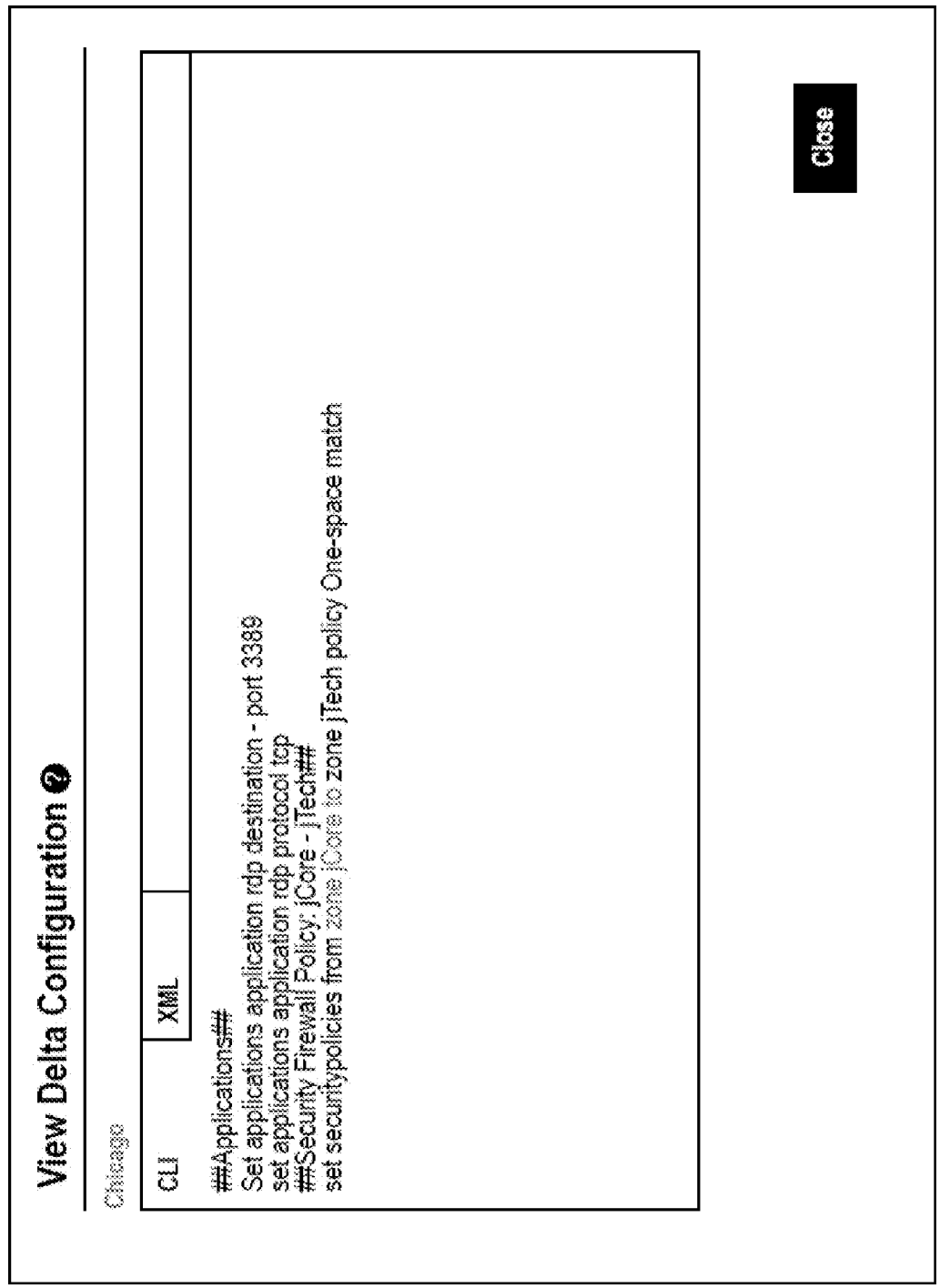

Threat control module 17 of security management system 10 may also, in response to selection of a particular device, as shown in FIG. 6A, present an interface by which administrator 12 may view information on security devices 5 associated with the selected threat, as shown in FIG. 6C. FIG. 6C illustrates an example user interface generated by security management system 10 by which an administrator 12 may view security device details associated with devices affected by the automatically created security policies, in one aspect of the disclosure. Threat control module 17 may present an interface with security policies and device information stored in candidate policy database 22 and/or committed policy database 24. In one example, the interface of FIG. 6C may include a device name 621, domain 622, managed status 623, connection status 624, policy type 625, and delta configuration 626. The delta configuration may include access to a command-line interface (CLI) and/or extensible markup language (XML) configuration of devices. For instance, threat control module 17 of security management system 10 may further, in response to selection of a delta configuration of a device, as shown in FIG. 6C, present an interface by which administrator 12 may view CLI and/or XML configuration of the selected device, as shown in FIG. 6D.

Figure 7:
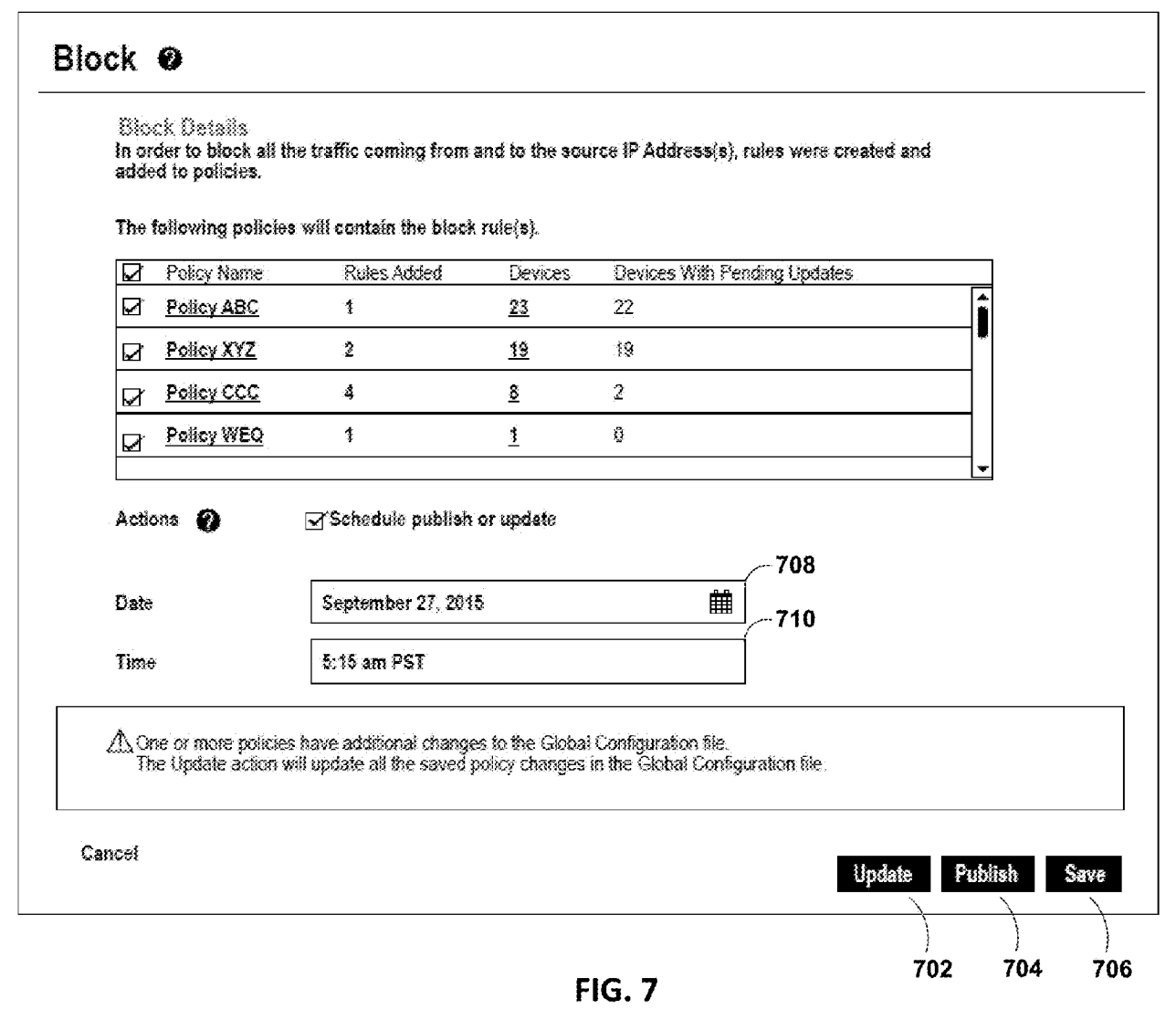

FIG. 7 illustrates an example user interface generated by security management system 10 by which an administrator 12 may enable deployment and/or publication of the automatically created security policies, in one aspect of the disclosure. Security management system 10 may include a candidate policy database 22 and a committed policy database 24 that interfaces with threat control module 17 and policy/rule module 20 of the security management system 10, as shown in FIG. 2. Threat control module 17 may present a user interface for administrator 12 to elect whether to update 702 (e.g., deploy), publish 704 (e.g., store for further review), or save 706 the automatically created security policies (either individually or as groups). In one example, an election to publish the automatically created security policies may store the security policies in candidate database 22 for further review. Publication of security policies may allow other administrators 12 to review, through a user interface generated by security management system 10, the automatically created security policies stored in candidate policy database 22 before deployment. After further review, the other administrators 12 may elect to update (e.g., deploy) the published security policies or to reconfigure the security policies.

An election to update security policies may store the automatically created security policies in committed policy database 24, in one example. Administrator 12 may elect to update security policies presented by user interface generated by security management 10 (as shown in FIG. 7) to push the automatically created security policies to security devices 5, such as through SNMP or NETCONF protocols. Security management system 10 may include a policy deployment engine 26 that executes on one or more processors of system 10 to send updated configuration information of security policies to security devices 5.

The interface of FIG. 7 may also present a user interface generated by security management system 10 by which administrator 12 may define a specific date 708 or time 710 to update 702 or publish 704 the automatically created security policies. For example, threat control module 17 may present administrator 12 an interface to schedule an update for Sep. 27, 2015 at 5:15 am PST. Upon selection to update 702 the policies, security management system 10 may store these updated security policies to candidate policy database 22 before Sep. 27, 2015 at 5:15 am PST. Security management system 10 may then store the updated security policies in committed policy database 24 when the policies are updated to security devices 5 on Sep. 27, 2015 at 5:15 am PST. Security management system 10 may further deploy the updated security policies stored within committed policy database 24 with policy deployment engine 26 to security devices 5. In one example, committed policy database 24 may be located in the security management system 10. In another example, security management system 10 may communicate with an external committed policy database 24.

Figure 8:
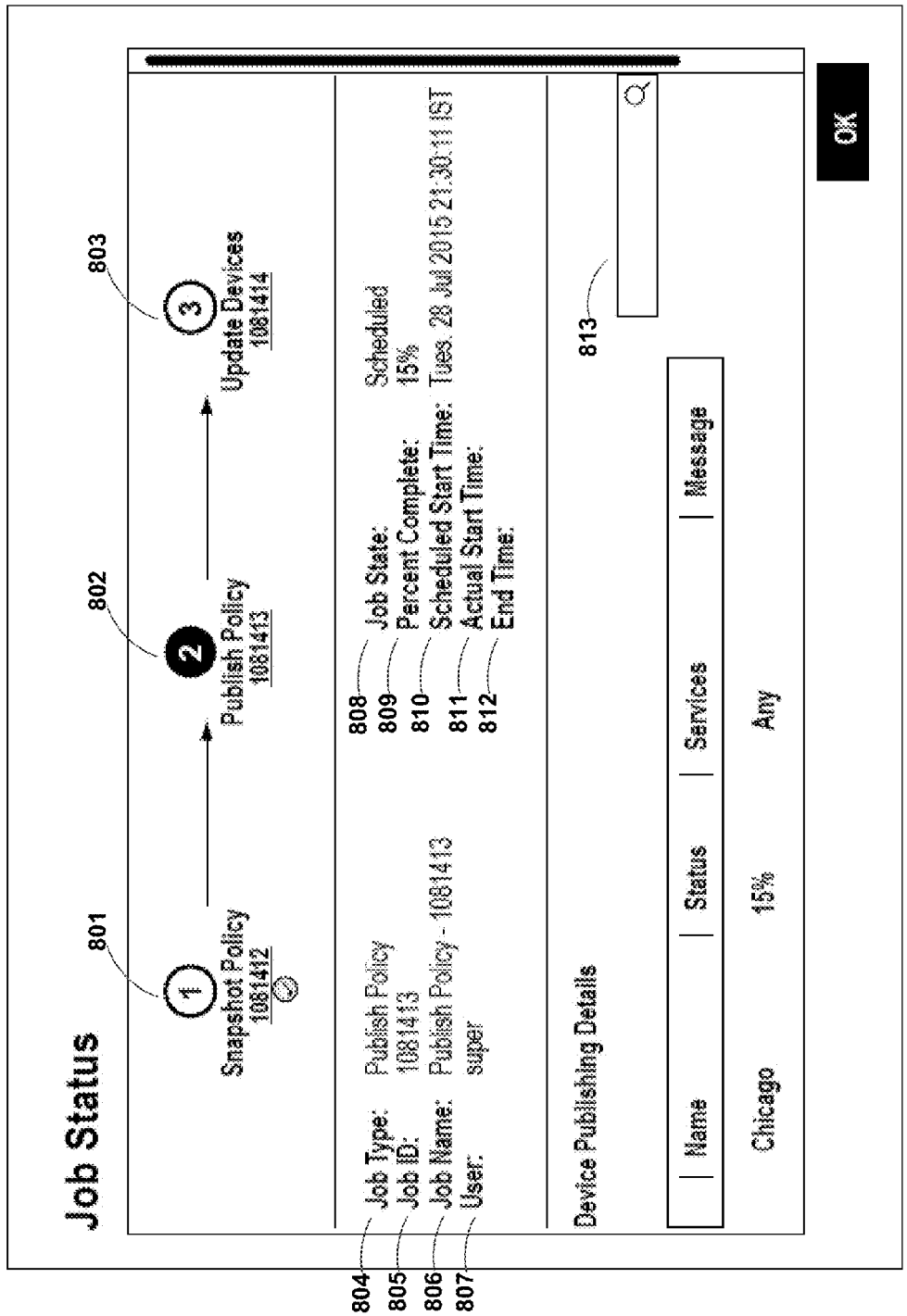
FIG. 8 illustrates an example user interface generated by security management system by which an administrator may view the job status of the published or updated security policies.

FIG. 8 illustrates an example user interface generated by security management system 10 by which administrator 12 may view the job status of the published or updated security policies. In one embodiment, threat control module 17 of security management system 10 may present a user interface by which an administrator 12 may provide information from candidate policy database 22 and/or committed policy database 24 on the phase of configuration policy updates, such as statuses snapshot policy 801, publish policy 802, and update devices 803. The interface of FIG. 8 generated by the security management system 10 may further display information including job type 804, job ID 805, job name 806, user 807, job status 808, percent complete 809, scheduled start time 810, actual start time 811, and end time 812. In another example, the interface of FIG. 8 may also search for device publishing details 813, including the name of the device, status of publication, services, and/or messages.

Figure 9:
FIG. 9 illustrates an example interface generated by security management system by which an administrator may view the source or destination details of the threat device, in one aspect of the disclosure.

FIG. 9 illustrates an example interface generated by security management system 10 by which administrator 12 may view the source or destination details of the threat device, in one aspect of the disclosure. In one example, threat control module 17 of security management system 10 may present a user interface presenting device information including source device details 901 and destination device details 902. The user interface may present device details including the device IP, device name, organization name, organization ID, physical address of the device (e.g., street address, city, state/province, postal code, country), registration date, updated date, and a reference link to more information about the device.

Figure 10:
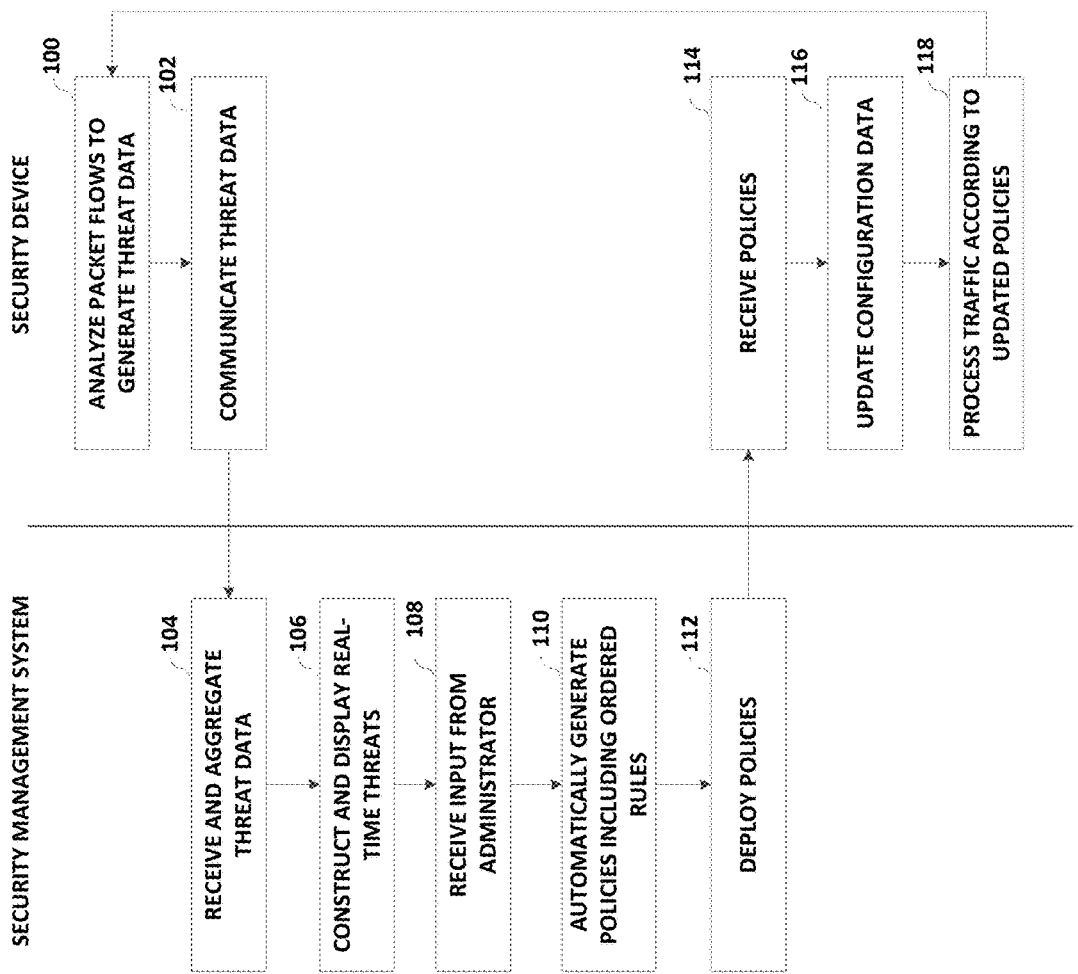
FIG. 10 is a flowchart showing an example operation of security management system.

FIG. 10 is a flowchart showing an example operation of security management system 10. As shown in FIG. 10, security devices 5 may initially analyze packet flows to identify applications and potential threat data (100). Security device 5 may proceed to communicate the potential threat data to security management system 10 (102). Security management system 10 may receive the communicated threat data from the security device 5 and aggregate the received data with threat data aggregator 14 (104). Security management system 10, through threat control module 17, may further construct and display the real-time or near real-time threats that have been aggregated by threat data aggregator 14 and stored in threat database 16, wherein the display may be a visualization generated by threat control module 17 in map, chart, grid view, or the like (106). Security management system 10, through threat control module 17, may further receive input from an administrator 12 to configure policies including the ordering of rules (108). For example, administrator 12 may configure policies directly from the display of real-time or near real-time threats and/or through various graphical representations of filtered event data associated with threats. Upon receiving the configuration input from administrator 12, security management system 10 may automatically generate newly configured or updated security policies including ordered rules using policy/rule module 20 (110). Security management system 10 may further deploy the generated or updated policies to security device 5 from through the policy deployment engine 26 (112). Security device 5 may then receive the deployed generated security policies from security management system 10 (114). Security device 5 may proceed to update the configuration data relating to the generated security policies from security management system 10 (116). Upon updating the configuration data with the security policies, security device 5 may process traffic according to the updated security policies (118).

Figure 11:
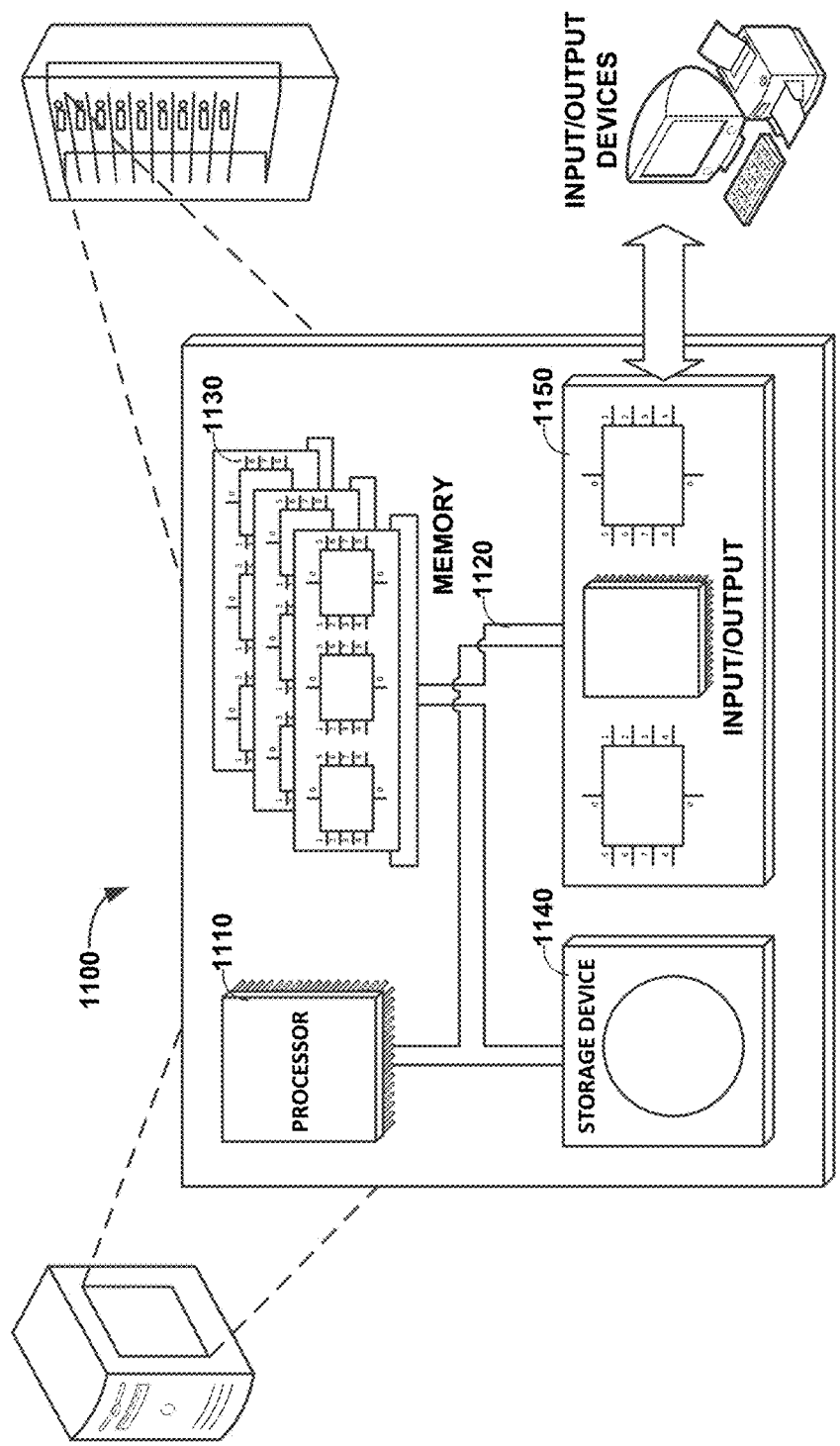
FIG. 11 shows a detailed example of a computing device that may be configured to implement some embodiments in accordance with the current disclosure.

FIG. 11 shows a detailed example of a computing device that may be configured to implement some embodiments in accordance with the current disclosure. For example, device 1100 may be a server, a workstation, a computing center, a cluster of servers or other example embodiments of a computing environment, centrally located or distributed, capable of executing the techniques described herein. Any or all of the devices may, for example, implement portions of the techniques described herein for a security management system. In this example, a computer 1100 includes a hardware-based processor 1110 that may be incorporated into security management system 10 to execute program instructions or software, causing the computer to perform various methods or tasks, such as performing the techniques described herein.

Processor 1110 may be a general purpose processor, a digital signal processor (DSP), a core processor within an Application Specific Integrated Circuit (ASIC) and the like. Processor 1110 is coupled via bus 1120 to a memory 1130, which is used to store information such as program instructions and other data while the computer is in operation. A storage device 1140, such as a hard disk drive, nonvolatile memory, or other non-transient storage device stores information such as program instructions, data files of the multidimensional data and the reduced data set, and other information. As another example, computer 1150 may provide an operating environment for execution of one or more virtual machines that, in turn, provide an execution environment for software for implementing the techniques described herein.

The computer also includes various input-output elements 1150, including parallel or serial ports, USB, Firewire or IEEE 1394, Ethernet, and other such ports to connect the computer to external device such as a keyboard, touchscreen, mouse, pointer or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various examples of the invention have been described. These and other examples are within the scope of the following claims.

What is claimed is:

1. A method, comprising:
receiving data on one or more threats;
displaying information on the one or more threats, wherein displaying information includes displaying one or more responses to the one or more threats;
selecting a response from the displayed one or more responses;
automatically generating configuration information for one or more security devices based on the selected response, wherein generating configuration information includes generating a security policy having automatically ordered rules for the one or more security devices and displaying the one or more security devices that will be affected by the security policy; and
deploying the configuration information to the one or more security devices.

2. The method of claim 1, wherein generating a security policy includes generating a rule that is placed within an existing set of rules for the one or more security devices based on the selected response.

3. The method of claim 1, wherein displaying information on the one or more threats includes grouping the one or more threats by a geographic location.

4. The method of claim 3, wherein selecting a response to the one or more threats includes selecting a response to block or allow traffic from a selected geographic location.

5. The method of claim 1, wherein displaying information on the one or more threats includes grouping the one or more threats by source of the one or more threats.

6. The method of claim 5, wherein selecting a response to the one or more threats includes selecting a response to block or allow traffic from a selected source of the one or more threats.

7. The method of claim 1, wherein displaying information on the one or more threats includes grouping the one or more threats by destination of the one or more threats.

8. The method of claim 7, wherein selecting a response to the one or more threats includes selecting a response to block or allow traffic from a selected destination of the one or more threats.

9. The method of claim 1, wherein displaying information on the one or more threats includes grouping the one or more threats by source of the one or more threats and destination of the one or more threats.

10. The method of claim 9, wherein selecting a response to the one or more threats includes selecting a response to block or allow traffic from a selected source of the one or more threats and a selected destination of the one or more threats.

11. The method of claim 1, wherein displaying information on the one or more threats includes grouping the one or more threats by application usage.

12. The method of claim 11, wherein selecting a response to the one or more threats includes selecting a response to block or allow traffic associated with a selected application.

13. The method of claim 11, wherein displaying information on the one or more threats further includes displaying one or more applications ranked by network bandwidth consumed across all instances of the same application.

14. The method of claim 13, wherein selecting a response to the one or more threats includes selecting a response to reduce network traffic associated with a selected application.

15. The method of claim 1, wherein displaying information on the threats includes grouping the one or more threats by user usage.

16. The method of claim 1, wherein selecting a response to the one or more threats includes selecting a response to block or allow traffic associated with a particular user.

17. The method of claim 15, wherein displaying information on the one or more threats further includes displaying one or more users ranked by a parameter.

18. The method of claim 17, wherein the parameter is a network bandwidth consumed by one or more users.

19. The method of claim 15, wherein selecting a response to the one or more threats includes selecting a response to reduce network traffic associated with a selected user.

20. The method of claim 15, wherein selecting a response to the one or more threats includes selecting a response to reduce active sessions associated with a selected user.

21. The method of claim 1, further comprising editing the configuration information generated for one or more security devices based on the selected response.

22. The method of claim 1, wherein generating the security policy includes modifying an order of an existing set of rules for the one or more security devices based on the selected response.

23. A security management system comprising:
one or more processors;
one or more computer-readable memories;
a threat data aggregator that executes on the one or more processors to aggregate data on one or more threats received from one or more security devices;
a threat control module that executes on the one or more processors, wherein the threat control module displays the one or more threats corresponding to the threat data aggregated by the threat data aggregator and configures one or more security policies of the one or more security devices based on the one or more threats displayed, wherein the threat control module further outputs, for display, one or more responses to the one or more threats;
a policy/rule module that executes on the one or more processors, wherein the policy/rule module automatically generates configuration information for the one or more security devices based on a selection of a response from the one or more responses, wherein the configuration information includes a security policy having automatically ordered rules for the one or more security devices; and
a policy deployment engine that executes on the one or more processors to send the configuration information to one or more of the one or more security devices,
wherein the threat control module further outputs, for display, the one or more security devices that will be affected by the security policy.

24. The security management system of claim 23, wherein the threat control module further displays a grouping of the one or more threats by at least a source or a destination.

25. The security management system of claim 23, wherein the one or more responses include blocking traffic based on a grouping.

26. The security management system of claim 23, wherein the one or more responses include allowing traffic based on a grouping.

27. The security management system of claim 23, wherein the configuration information for the one or more security devices is generated in response to a selection of the one or more responses.

28. The security management system of claim 23, wherein the configuration information for the one or more security devices includes one or more security policies for a particular IP address, wherein the particular IP address is identified based on a location of the one or more threats.

29. The security management system of claim 23, wherein the configuration information for the one or more security devices includes one or more security policies for an IP address based on at least one of a bandwidth consumed by an application or a number of sessions associated with the application.

* * * * *